United States Patent
Ohzawa

(10) Patent No.: US 7,922,340 B2
(45) Date of Patent: Apr. 12, 2011

(54) PROJECTION OPTICAL SYSTEM WITH ENLARGEMENT AT A VARYING MAGNIFICATION

(75) Inventor: Soh Ohzawa, Toyonaka (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 550 days.

(21) Appl. No.: 12/030,403

(22) Filed: Feb. 13, 2008

(65) Prior Publication Data

US 2008/0192336 A1 Aug. 14, 2008

(30) Foreign Application Priority Data

Feb. 14, 2007 (JP) .................................. 2007-033038
Feb. 5, 2008 (JP) .................................. 2008-025615

(51) Int. Cl.
G03B 21/28 (2006.01)
G03B 21/20 (2006.01)
G02B 5/10 (2006.01)
G02B 7/182 (2006.01)

(52) U.S. Cl. .............. 353/99; 353/85; 353/97; 359/859; 359/863

(58) Field of Classification Search .................... 353/99, 353/38, 85, 97; 359/859, 863
See application file for complete search history.

(56) References Cited

U.S. PATENT DOCUMENTS

| 6,626,541 B2 * | 9/2003 | Sunaga ............................ 353/69 |
| 6,883,922 B2 | 4/2005 | Kurematsu et al. ............ 359/859 |
| 6,951,395 B2 * | 10/2005 | Chatani et al. .................. 353/99 |
| 7,048,388 B2 | 5/2006 | Takaura et al. ................. 353/99 |
| 7,086,742 B2 | 8/2006 | Hatakeyama et al. .......... 353/70 |
| 7,101,052 B2 * | 9/2006 | Sunaga ............................ 353/99 |
| 2004/0027662 A1 | 2/2004 | Kurioka et al. ................ 359/449 |
| 2006/0126029 A1 | 6/2006 | Hatakeyama et al. .......... 353/70 |
| 2007/0184368 A1 | 8/2007 | Nishikawa et al. ............. 430/30 |
| 2007/0216877 A1 | 9/2007 | Sacre et al. ..................... 353/97 |
| 2008/0192208 A1 | 8/2008 | Benoit et al. .................... 353/85 |
| 2008/0304019 A1 | 12/2008 | Takaura et al. ................. 353/38 |

FOREIGN PATENT DOCUMENTS

| EP | 1460842 A1 * | 9/2004 |
| JP | 2001-264634 A | 9/2001 |
| JP | 2004-61959 A | 2/2004 |
| JP | 2004-258620 A | 9/2004 |
| JP | 2004-279988 A | 10/2004 |
| JP | 2007-531030 A | 11/2007 |
| WO | WO 2006/043666 A1 | 4/2006 |

OTHER PUBLICATIONS

Japanese "Notification of Grounds for Rejection" dated Jan. 20, 2009 for counterpart Japanese Application No. 2008-025615; Together with an English-language translation thereof.

* cited by examiner

*Primary Examiner* — Georgia Y Epps
*Assistant Examiner* — Magda Cruz
(74) *Attorney, Agent, or Firm* — Sidley Austin LLP

(57) ABSTRACT

A projection optical system that receives light from a display element to project an image displayed by the display element onto a screen with enlargement at a varying magnification achieved by varying the projection distance to the screen has: a refractive optical system composed of one or more refractive lenses and having a positive optical power; and a concave-surfaced mirror disposed to the screen side of the refractive optical system and having a plane-symmetric reflective surface. The projection optical system includes at least one optical element designed to be movable for focusing. The projection optical system forms an intermediate image between the refractive optical system and the concave-surfaced mirror. Moreover, a prescribed conditional formula is fulfilled.

21 Claims, 16 Drawing Sheets

FIG.11A
FIG.11B
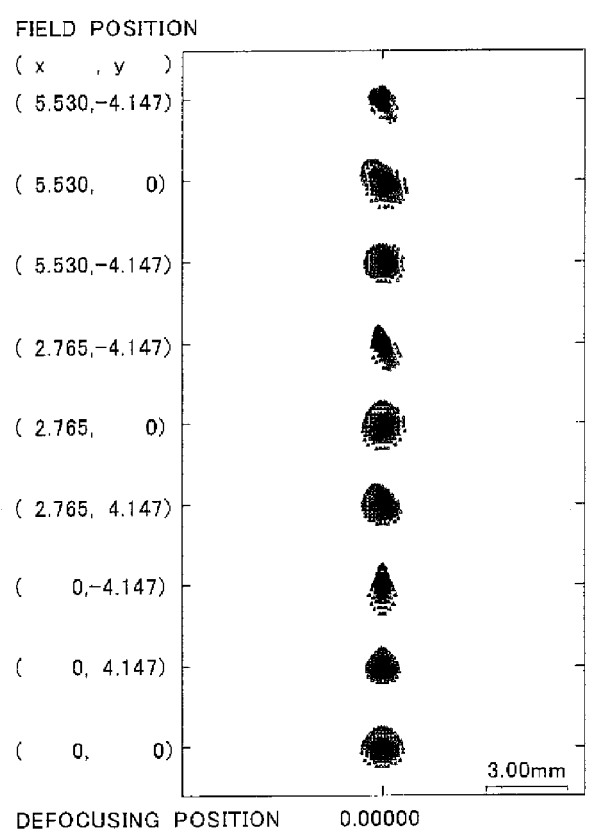
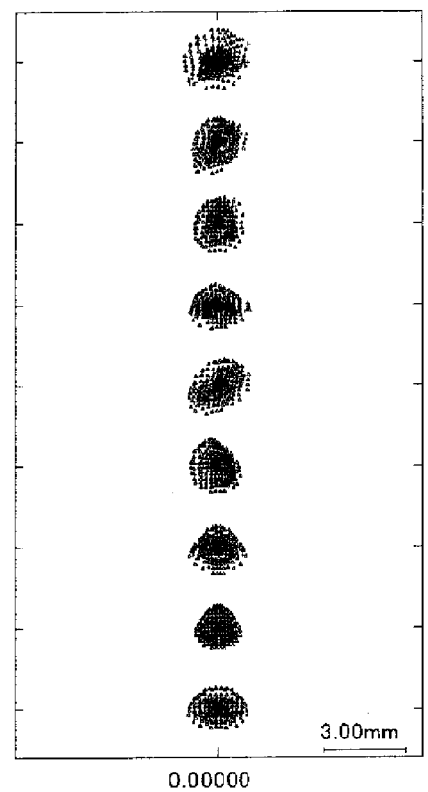

PROJECTION OPTICAL SYSTEM WITH ENLARGEMENT AT A VARYING MAGNIFICATION

This application is based on Japanese Patent Application No. 2007-33038 filed on Feb. 14, 2007 and Japanese Patent Application No. 2008-25615 filed on Feb. 5, 2008, the contents of which are hereby incorporated by reference.

BACKGROUND OF THE INVENTION

1. Field of the Invention

The present invention relates to a projection optical system, and more particularly to a projection optical system for short-distance front projection whereby, for example, a large image is projected from a position close to a screen.

2. Description of Related Art

In recent years, projectors employing a digital micromirror device or LCD (liquid crystal display) have been becoming increasingly popular, and various types of them have been proposed. For example, as projection optical systems adopting oblique projection to offer a short projection distance, Patent Document 1 listed below proposes a type in which the last surface is a convex-surfaced mirror; on the other hand, Patent Document 2 to 4 listed below propose a type in which the last surface is a concave-surfaced mirror.

Patent Document 1: JP-A-2001-264634
Patent Document 2: U.S. Pat. No. 6,883,922
Patent Document 3: U.S. Pat. No. 7,086,742
Patent Document 4: U.S. Pat. No. 7,048,388

With the type in which the last surface is a convex-surfaced mirror as proposed in Patent Document 1, short-distance projection makes the angle of incidence of rays on the screen so large that, in front projection and similar applications, as the distance to the screen varies, the position of the projected image greatly varies in the up/down direction. Thus, in cases where, for example, the projection optical system is set up on a desk, as the projection distance increases, the image moves upward over so long a distance that it is difficult to view the image.

On the other hand, with the type in which the last surface is a concave-surfaced mirror as proposed in Patent Documents 2 to 4, it is possible to make the angle of incidence of rays on the screen comparatively small, and it is thus possible to make comparatively small the amount by which the projected image moves as the projection distance varies. Inconveniently, however, including two or more curved-surfaced mirrors, the projection optical systems proposed there have a large dimension in the up/down direction, and thus, when used as a projection optical system for front projection in a state set up on a desk, they obstruct the viewing of the image. Moreover, these projection optical systems are designed for rear projection, and accordingly do not have a focusing mechanism. Thus, in front projection applications, they cannot focus.

SUMMARY OF THE INVENTION

In view of the conventionally encountered inconveniences mentioned above, it is an object of the present invention to provide a compact, high-performance projection optical system that produces, in short-distance front projection, a satisfactory projected image with a size in the range of about 60 to 100 inches owing to focusing, for coping with a variation in the projection distance, being performed with minimum up/down movement of the image in the height direction.

To achieve the above object, according to one aspect of the invention, a projection optical system that receives light from a display element to project an image displayed by the display element onto a screen with enlargement at a varying magnification achieved by varying the projection distance to the screen is provided with: a refractive optical system that is composed of one or more refractive lenses and that has a positive optical power; and a concave-surfaced mirror that is disposed to the screen side of the refractive optical system and that has a plane-symmetric reflective surface. Here, the projection optical system includes at least one optical element that is designed to be movable for focusing. Moreover, the projection optical system forms an intermediate image of the displayed image between the refractive optical system and the concave-surfaced mirror. Furthermore, conditional formula (1) below is fulfilled:

$$4° < \theta 1 < 20° \quad (1)$$

where

θ1 represents the angle of incidence, as measured on the cross-section of the concave-surfaced mirror along the plane of symmetry thereof, at which the ray, among the rays incident on the screen when projection is performed at the shortest distance, that forms the smallest angle with a line normal to the screen surface is incident on the concave-surfaced mirror.

BRIEF DESCRIPTION OF THE DRAWINGS

FIGS. 11A and 11B are spot diagrams of Example 3;

DETAILED DESCRIPTION OF PREFERRED EMBODIMENTS

Hereinafter, embodiments etc. of projection optical systems according to the invention will be described with reference to the accompanying drawings. According to the invention, a projection optical system that receives light from a display element to project the image displayed by the display element onto a screen with enlargement is characterized in that it includes a refractive optical system composed of one or more refractive lenses and having a positive optical power and a concave-surfaced mirror disposed to the screen side of the refractive optical system, in that it forms an intermediate image of the displayed image in the space between the refractive optical system and the concave-surfaced mirror, and in that it includes at least one optical element movable for focusing. Disposing the concave-surfaced mirror to the screen side helps reduce, as described earlier, the variation of the projection position (that is, the up/down movement of the projected image) which occurs as the projection distance varies. This will now be described more specifically with reference to FIGS. 13A and 13B.

Figure 13A:
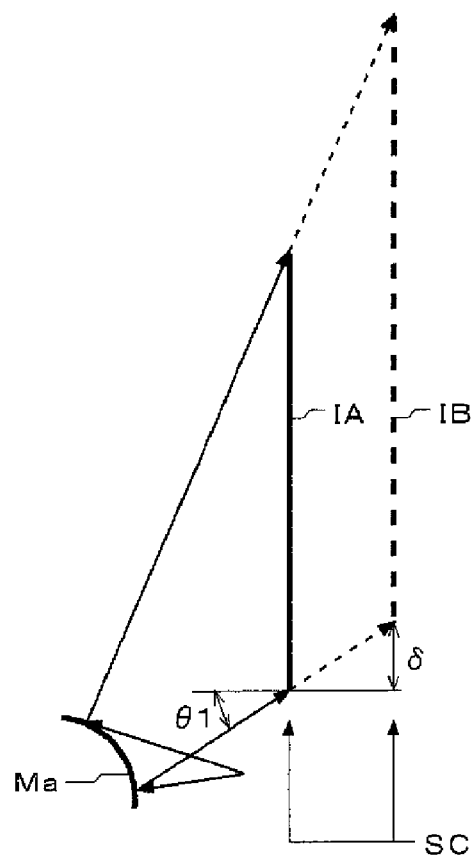
FIGS. 13A and 13B are schematic diagrams illustrating the movement of the image surface during focusing.
Figure 13B:
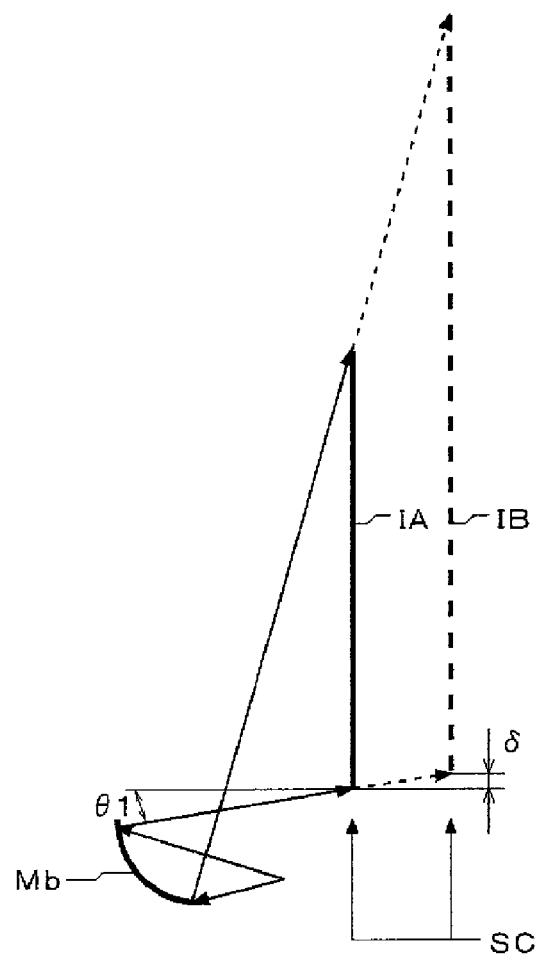

As shown in FIG. 13A, when front projection is performed from an oblique direction by use of a projection optical system having a convex-surfaced mirror Ma to the screen SC side, the angle of incidence $\theta 1$ of rays on the screen SC is so large that, as the projection distance varies, the position of the projected image IA or IB on the screen SC greatly varies in the up/down direction ($\delta$ represents the amount of movement of the projected image IA or IB). By contrast, as shown in FIG. 13B, when front projection is performed from an oblique direction by use of a projection optical system having a concave-surfaced mirror Mb to the screen SC side, it is possible to make the angle of incidence $\theta 1$ of rays on the screen SC comparatively small, and it is thus possible to make comparatively small the amount $\delta$ by which the projected image IA or IB moves as the projection distance varies.

Thus, with a projection optical system that includes a refractive optical system having a positive optical power and a concave-surfaced mirror disposed to the screen side of the refractive optical system and that forms an intermediate image of the displayed image in the space between the refractive optical system and the concave-surfaced mirror, it is possible to make the amount of movement $\delta$ of the projected image IA or IB small as described above. This makes it possible, in short-distance front projection, to perform focusing, for coping with a variation in the projection distance, with minimum up/down movement of the projected image in the height direction. Below will be described, along with other advantageous features, conditions that should preferably be fulfilled to obtain a satisfactory projected image with a size in the range of about 60 to 100 inches while more effectively reducing the variation of the projection position.

It is preferable that a projection optical system
include a refractive optical system composed of one or more refractive lenses and having a positive optical power and a concave-surfaced mirror disposed to the screen side of the refractive optical system,
form an intermediate image in the space between the refractive optical system and the concave-surfaced mirror,
include at least one optical element movable for focusing,
have a plane-symmetric reflective surface as the reflective surface of the concave-surfaced mirror, and
fulfill conditional formula (1) below:

$$4°<\theta 1<20° \quad (1)$$

where
$\theta 1$ represents the angle of incidence, as measured on the cross-section of the concave-surfaced mirror along the plane of symmetry thereof, at which the ray, among the rays incident on the screen when projection is performed at the shortest distance, that forms the smallest angle with a line normal to the screen surface is incident on the concave-surfaced mirror.

Figure 14:
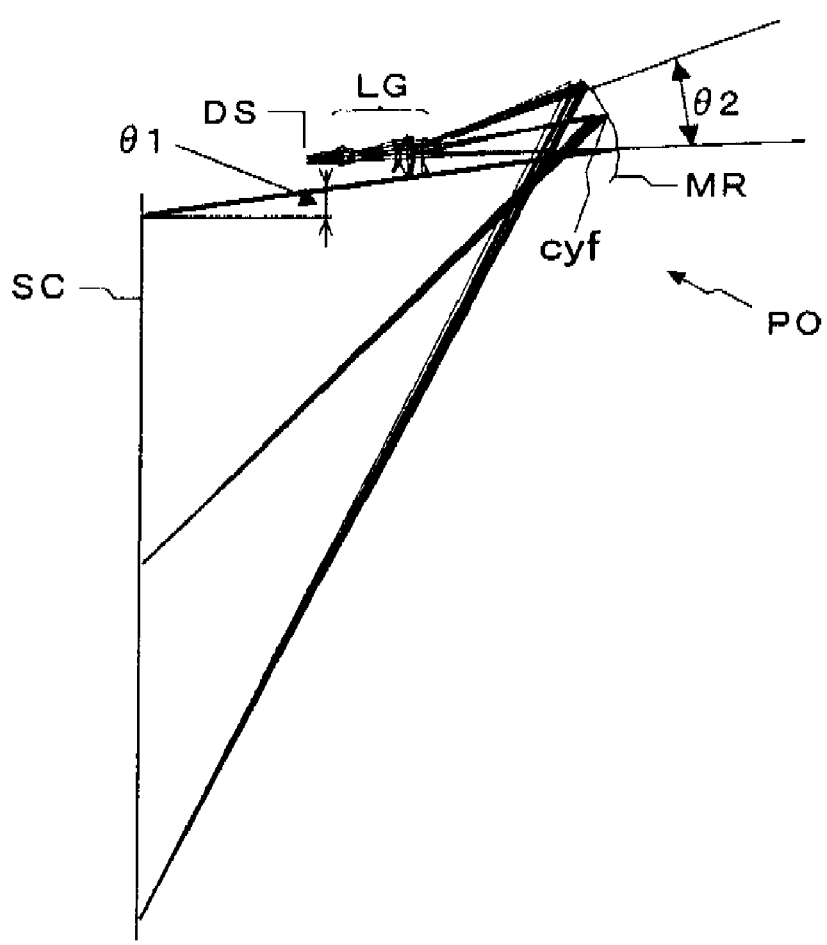
FIG. 14 is a schematic diagram illustrating the angles θ1 and θ2 of rays appearing in conditional formulae (1) and (2)

FIG. 14 shows the angle of incidence $\theta 1$. In FIG. 14, DS represents a display element, SC represents a screen, PO represents a projection optical system, LG represents a refractive optical system having a positive optical power, and MR represents a concave-surfaced mirror. Conditional formula (1) defines a conditional range that should preferably be fulfilled by the minimum angle of incidence $\theta 1$ of rays on the screen SC. When conditional formula (1) is fulfilled, it is possible to effectively reduce the variation of the projection position which results from a variation in the projection distance. If the lower limit of conditional formula (1) is disregarded, the rays from the concave-surfaced mirror to the screen interfere with the refractive optical system, and are thus vignetted. If the upper limit of conditional formula (1) is disregarded, as the distance to the screen is varied by focusing, the projected image moves over an unduly long distance in the up/down direction.

It is preferable to adopt a construction that has only one concave-surfaced mirror as a mirror having an optical power, and it is further preferable that, as a mirror having an optical power, only one concave-surfaced mirror be provided at the screen-side end. Compared with a refractive surface, the reflective surface of a mirror having an optical power suffers, as the surface shape thereof varies, a larger variation in the angle of emergence of rays; it thus has the disadvantages of requiring higher surface accuracy, and thus being more difficult to fabricate, than a refractive surface. Using only one such mirror surface helps reduce variations in performance in mass fabrication. Moreover, since using many powered mirrors increases the dimension of the projection optical system in the height direction, using only one concave-surfaced mirror helps make the projection optical system slim and compact.

It is preferable that the reflective surface of the concave-surfaced mirror be a free-form curved surface. With this design, it is possible to correct distortion satisfactorily even in short-distance projection. It is preferable that the refractive optical system include at least one free-form curved surface. With this design, it is possible to satisfactorily correct the distortion, astigmatism, and curvature of field caused by short-distance oblique projection. It is further preferable to dispose the free-form curved surface on a lens located closest to the concave-surfaced mirror in the refractive optical system. With this design, it is possible to dispose the free-form curved surface at a position where rays of different image heights are separate from one another, and thus it is possible to better correct the distortion, astigmatism, and curvature of field caused by short-distance oblique projection.

It is preferable that a mirror or refractive lens having a free-form curved surface be formed of plastic material. Forming an optical element (lens, mirror, or the like) having a free-form curved surface out of plastic helps reduce the cost of the optical element.

It is preferable that, to the display element side of the concave-surfaced mirror, only one or more refractive lenses be provided as optical elements having an optical power, and that conditional formula (2) below be fulfilled:

$$8°<\theta 2<25° \quad (2)$$

where, when the display element has a rectangular image-display area and the ray that travels from the center of the image-display area through the center of an aperture stop to the center of the screen is called the image center ray, θ2 represents the angle, as measured on the cross-section of the display element along the plane parallel to the shorter sides of the image-display area and including the image center ray, that the principal rays that have left the upper end and the lower end of the image-display area of the display element form when leaving the refractive optical system when projection is performed at the shortest distance.

FIG. 14 also shows the angle of divergence θ2 of rays. Conditional formula (2) defines a conditional range that should preferably be fulfilled by the angle θ2 formed by the rays leaving the refractive optical system LG. When conditional formula (2) is fulfilled, it is possible to achieve a proper balance between the optical performance and size of the projection optical system PO. If the lower limit of conditional formula (2) is disregarded, the divergence of the rays leaving the refractive optical system is so small that enlarging them greatly in short-distance projection requires an unduly high optical power on the concave-surfaced mirror. This makes it difficult to correct the distortion and curvature of field produced by the concave-surfaced mirror. If the upper limit of conditional formula (2) is disregarded, the divergence of the rays leaving the refractive optical system is so large that the concave-surfaced mirror, which receives them, needs to be made accordingly large. This increases the size of the projection optical system as a whole, and makes it difficult to make it compact.

It is preferable that conditional formula (3) below be fulfilled:

$$1.15 < cxf/cyf < 1.65 \qquad (3)$$

where, when the display element has a rectangular image-display area and the ray that travels from the center of the image-display area through the center of an aperture stop to the center of the screen is called the image center ray, cxf represents the curvature, as measured in the direction of the longer sides of the image-display area, that the reflective surface of the concave-surfaced mirror has at the position at which the image center ray is incident thereon, and cyf represents the curvature, as measured in the direction of the shorter sides of the image-display area, that the reflective surface of the concave-surfaced mirror has at the position at which the image center ray is incident thereon.

Conditional formula (3) defines the shape that the reflective surface should preferably have at the position at which the image center ray is incident on the concave-surfaced mirror. If the lower limit of conditional formula (3) is disregarded, the difference between the magnifications in the vertical and horizontal directions caused by oblique projection cannot be satisfactorily corrected with the concave-surfaced mirror. This leads to unsatisfactorily oblique projection, and causes the beam reflected from the mirror to interfere with the refractive optical system. If the upper limit of conditional formula (3) is disregarded, it is certainly possible to increase the angle of the screen in oblique projection, but either it is difficult to correct the resulting trapezoidal distortion, or it is necessary to make the concave-surfaced mirror larger to correct the trapezoidal distortion, thus increasing the size of the projection optical system.

It is further preferable that conditional formula (3a) below be fulfilled:

$$1.25 < cxf/cyf < 1.55 \qquad (3a)$$

Conditional formula (3a) defines a further preferable conditional range within the conditional range defined by conditional formula (3) above. In an arrangement where the concave-surfaced mirror is disposed so as to fulfill conditional formula (1) above, when conditional formula (3a) is fulfilled, it is possible to correct the difference between the magnifications in the vertical and horizontal directions caused by oblique projection satisfactorily with the concave-surfaced mirror, thus it is possible to perform satisfactorily oblique projection, resulting in a satisfactory projection magnification in short-distance projection; or it is easy to perform short-distance projection. Moreover, the concave-surfaced mirror then produces moderate astigmatism, making it easy for the refractive optical system to correct aberrations.

It is preferable that conditional formula (4) below be fulfilled:

$$-0.07 < cyf \times OPK1/\beta yk < -0.03 \qquad (4)$$

where, when the display element has a rectangular image-display area and the ray that travels from the center of the image-display area through the center of an aperture stop to the center of the screen is called the image center ray, cyf represents the curvature, as measured in the direction of the shorter sides of the image-display area, that the reflective surface of the concave-surfaced mirror has at the position at which the image center ray is incident thereon, OPK1 represents the optical path length of the image center ray from the reflective surface of the concave-surfaced mirror to the screen surface when projection is performed at the shortest distance, and βyk represents the magnification on the screen surface when projection is performed at the shortest distance, as measured in the direction of the shorter sides of the image-display area.

Conditional formula (4) defines the shape that the reflective surface should preferably have at the position at which the image center ray is incident on the concave-surfaced mirror. If the lower limit of conditional formula (4) is disregarded, the optical power of the concave-surfaced mirror is so strong that it is difficult to correct the distortion and curvature of field produced by the concave-surfaced mirror. If the upper limit of conditional formula (4) is disregarded, the optical power of the concave-surfaced mirror is so weak that either it is difficult to obtain satisfactory wide-angularity and hence a satisfactory enlargement magnification or it is necessary to make the concave-surfaced mirror larger.

It is further preferable that conditional formula (4a) below be fulfilled:

$$-0.06 < cyf \times OPK1/\beta yk < -0.04 \qquad (4a)$$

Conditional formula (4a) defines a further preferable conditional range within the conditional range defined by conditional formula (4) above. In an arrangement where the concave-surfaced mirror is disposed so as to fulfill conditional formula (1) above, when conditional formula (4a) is fulfilled, the optical power of the concave-surfaced mirror is properly set, and the sensitivity to errors is reduced. This makes it possible to reduce fabrication variations in mass fabrication, and helps prevent the concave-surfaced mirror from becoming large.

It is preferable that conditional formula (5) below be fulfilled:

$$0.7 < Sd/Ent < 1.1 \qquad (5)$$

where

Sd represents the distance from the image-display surface of the display element to the aperture, and Ent represents the distance from the image-display surface of the display element to the entrance pupil of the projection optical system.

If the lower limit of conditional formula (5) is disregarded, the distance from the display element to the position of the entrance pupil is farther than the position of the actual aperture stop, making the rays traveling from the display element to the projection optical system more telecentric. This increases the lens diameters near the display element, and increases the total length of the refractive optical system. If the upper limit of conditional formula (5) is disregarded, the entrance pupil is too close to the display element, resulting in too short a back-focal length. This makes it difficult to shine the light from an illumination light source into the refractive optical system without interference, or makes the angle of rays relative to the display element so large as to diminish the illuminance at periphery.

It is preferable that conditional formula (6) below be fulfilled:

$$-0.35 < cyf \times kyf < -0.05 \quad (6)$$

where, when the display element has a rectangular image-display area and the ray that travels from the center of the image-display area through the center of an aperture stop to the center of the screen is called the image center ray, cyf represents the curvature, as measured in the direction of the shorter sides of the image-display area, that the reflective surface of the concave-surfaced mirror has at the position at which the image center ray is incident thereon, and kyf represents the focal length, as measured in the direction of the shorter sides of the image-display area (the y-direction of the later-described coordinate system), that the refractive optical system has at the position at which the image center ray passes therethrough.

If the lower limit of conditional formula (6) is disregarded, the optical power of the concave-surfaced mirror is so strong that it is difficult to correct the distortion and curvature of field produced by the concave-surfaced mirror, or the optical power of the refractive optical system is so weak as to increase the total length of the refractive optical system, making the projection optical system no longer compact. If the upper limit of conditional formula (6) is disregarded, the optical power of the concave-surfaced mirror is so weak that it is impossible to obtain satisfactory wide-angularity with the concave-surfaced mirror, making it difficult to obtain a satisfactory enlargement magnification in the projected image, or the focal length of the refractive optical system is so short that it is difficult to correct the curvature of field and spherical aberration produced by the refractive optical system.

It is further preferable that conditional formula (6a) below be fulfilled:

$$-0.27 < cyf \times kyf < -0.09 \quad (6a)$$

Conditional formula (6a) defines a further preferable conditional range within the conditional range defined by conditional formula (6) above. In an arrangement where the concave-surfaced mirror is disposed so as to fulfill conditional formula (1) above, if the conditional formula (6a) is fulfilled, the optical power of the concave-surfaced mirror is properly set, and the sensitivity to errors is reduced; thus, it is possible to reduce fabrication variations in mass fabrication; or it is possible to make the concave-surfaced mirror compact; or it is possible to set the focal length of the refractive optical system properly for aberration correction and to realize a compact projection optical system; or it is possible to reduce the sensitivity of the refractive optical system to errors and to reduce fabrication variations in mass fabrication.

It is preferable that the concave-surfaced mirror be moved for focusing. It is preferable that the concave-surfaced mirror, disposed at the screen-side end, be moved for focusing in such a way that, for focusing from a state in which the screen is close to the projection optical system (a short-distance projection state) to a state in which they are far away from each other (a long-distance projection state), the concave-surfaced mirror move toward the display element. With a design that achieves focusing by moving the concave-surfaced mirror disposed at the screen-side end, it is possible to satisfactorily correct the variation of the distortion and curvature of field that occurs during focusing.

In a combination of one concave-surfaced mirror disposed at the screen-side end and a refractive optical system, using at least the concave-surfaced mirror for focusing helps make the oblique projection optical system compact. It is further preferable that, for focusing, the concave-surfaced mirror disposed at the screen-side end and part or the whole of the refractive optical system be moved with different patterns of movement. With this design, it is possible to better correct the variation of the distortion and curvature of field that occurs during focusing; thus, advantageously, it is possible to expand the projection distance over which focusing is possible with satisfactory performance.

Figure 16:
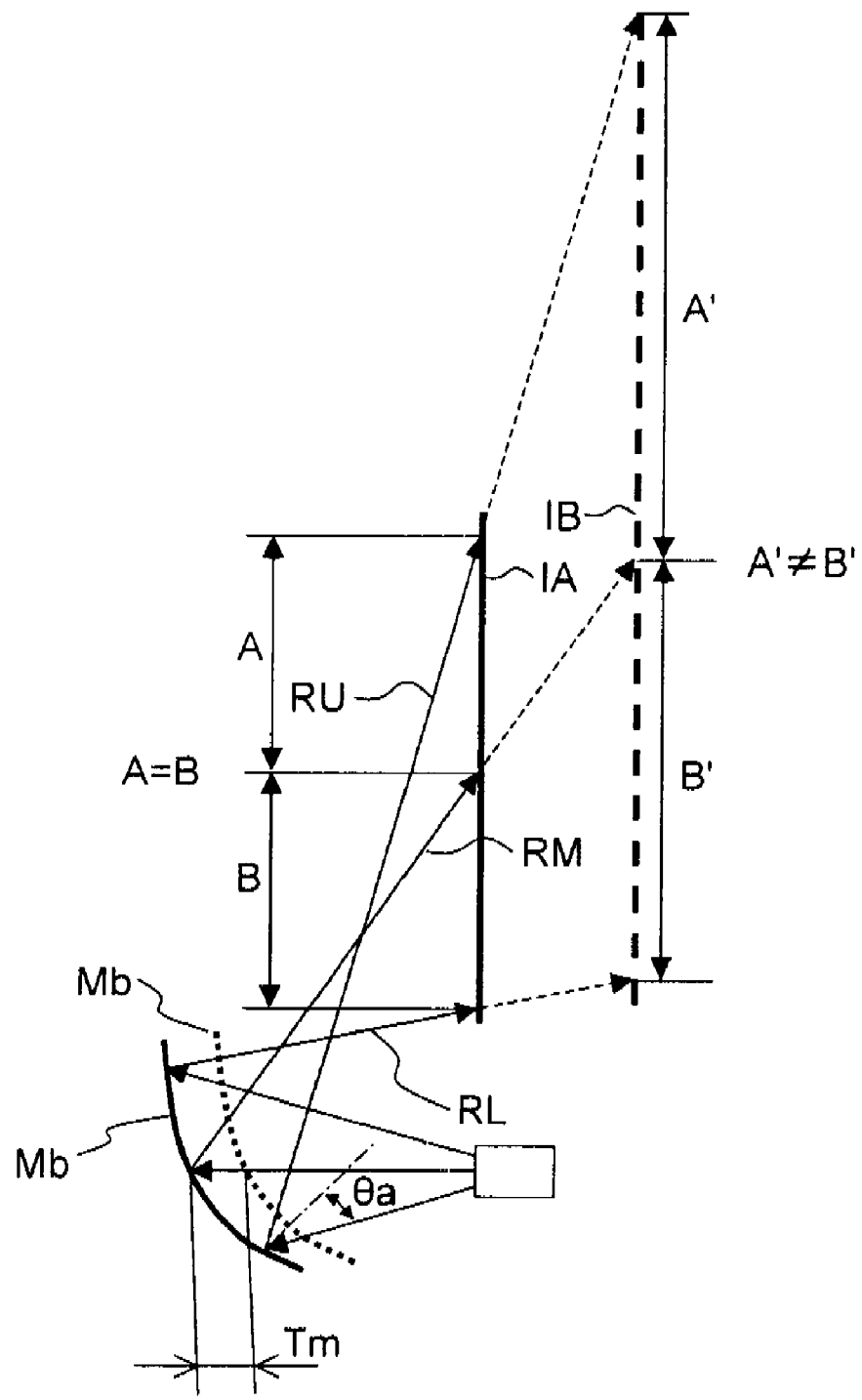
FIG. 16 is a schematic diagram illustrating distortion in the projected image during focusing.

In an oblique projection optical system employing a concave-surfaced mirror, as shown in FIG. 16, rays RU that are obliquely incident on the screen at a large angle of incidence are bounced sharply upward on part of the concave-surfaced mirror close to the screen to reach the screen. Thus, the exit pupil of these rays RU is closer to the screen than is that of the other rays. Because of this optical path of the rays RU, as focusing is performed for a farther screen position, if the angle of rays is kept fixed, the image extends in the direction of rays that are obliquely incident on the screen at a large angle of incidence. That is, in short-distance projection, the interval A between the rays RU reaching the upper end of the screen and the rays RM reaching the middle of the screen is equal to the interval B between the rays RL reaching the lower end of the screen and the rays RM reaching the middle of the screen; by contrast, at a higher enlargement magnification, the interval A' between the rays RU reaching the upper end of the screen and the rays RM reaching the middle of the screen is different from the interval B' between the rays RL reaching the lower end of the screen and the rays RM reaching the middle of the screen. This makes the projected image IB distorted.

To prevent this distortion in the projected image, that is, to make A'=B', it is preferable that, at least in the range in which conditional formula (7) below is fulfilled, in the focused state, the angle of rays incident on the concave-surfaced mirror fulfill conditional formula (8) below:

$$1.4 \leq \beta ye/\beta yk \leq 1.8 \quad (7)$$

$$0.08 < (\theta ak - \theta ae) \times \beta yk/\beta ye < 1.2 \quad (8)$$

where

θak represents the angle of incidence, as measured on the cross-section of the display element along a plane parallel to the shorter sides of the image-display area, of the ray, among the rays traveling from the display element through the center of the aperture stop to the screen, that is most obliquely incident on the screen is incident on the concave-surfaced mirror when projection is performed at the shortest distance, θae represents the angle of incidence, as measured on the cross-section of the display element along a plane parallel to the shorter sides of the image-display area, of the ray, among the rays traveling from the display element through the center of the aperture stop to the screen, that is most obliquely incident on the screen is incident on the concave-surfaced mirror when projection is performed at a long distance, βyk represents the magnification on the screen surface when projection is performed at the shortest distance, as measured in the direction of the shorter sides of the image-display area, and βye represents the magnification on the screen surface when projection is performed at a long distance, as measured in the direction of the shorter sides of the image-display area.

A front-projection projector typically projects an image with a size in the range of about 60 to 100 inches. Accordingly, it is preferable to reduce image distortion in the corresponding range of projection magnification. If the lower limit of conditional formula (8) is disregarded, the variation of the angle of incidence of rays on the concave-surfaced mirror in the focused state is so small that the deformation of the image in the focused state is undercorrected. If the upper limit of conditional formula (8) is disregarded, the variation of the angle of incidence of rays on the concave-surfaced mirror is so large that the deformation of the image is overcorrected.

It is preferable that, for focusing, the concave-surfaced mirror be moved relative to the display element, and that, at least in the range in which conditional formula (7) is fulfilled, formula (9) below be fulfilled:

$$0.1 < (1/OPK1 - 1/OPE1) \times Tm \times \beta yk < 1.2 \quad (9)$$

where

OPK1 represents the optical path length of the image center ray from the reflective surface of the concave-surfaced mirror to the screen surface when projection is performed at the shortest distance, OPE1 represents the optical path length of the image center ray from the reflective surface of the concave-surfaced mirror to the screen surface when projection is performed at a long distance, and Tm represents the amount of movement of the concave-surfaced mirror from the position thereof for shortest-distance projection to the position thereof for long-distance projection with respect to the display element (with the concave-surfaced mirror moving in the direction in which it approaches the display element from the position for shortest-distance projection to the position for long-distance projection).

If the lower limit of conditional formula (9) is disregarded, the amount of movement of the concave-surfaced mirror for focusing is small, and thus the variation, during focusing, of the positions at which rays strikes the concave-surfaced mirror is small, making it difficult to correct the curvature of field and distortion caused by focusing. If the upper limit of the conditional formula (9) is disregarded, the amount of movement of the concave-surfaced mirror for focusing is large, and thus the variation, during focusing, of the positions at which rays strikes the concave-surfaced mirror is large, causing excessively large variation of curvature of field and distortion on the concave-surfaced mirror and making it difficult to correct them.

It is further preferable that an aspherical surface be disposed in the vicinity of an aperture stop in the refractive optical system. With this design, it is possible to correct the spherical aberration produced by the refractive optical system, and thereby to realize a brighter projection optical system.

Figure 15:
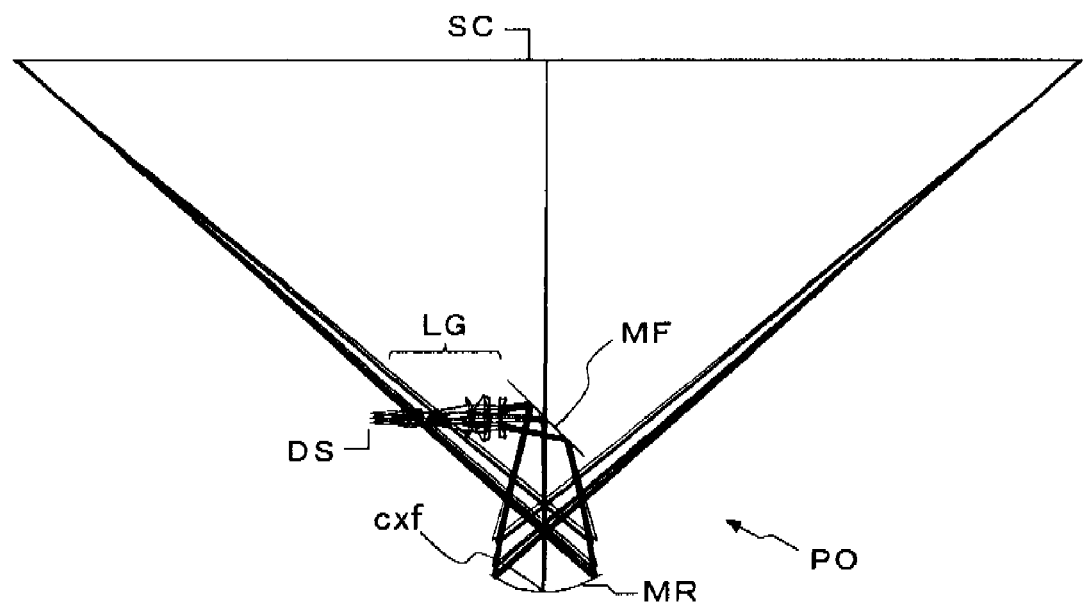
FIG. 15 is an optical path diagram showing an example of an optical construction in which the optical path is bent with a flat-surfaced mirror disposed between a refractive optical system and a concave-surfaced mirror.

It is preferable that a flat-surfaced mirror be disposed between the refractive optical system and the concave-surfaced mirror so that the projection optical system is so constructed as to bend the optical path in the direction substantially perpendicular to the oblique projection cross-section. For example, it is preferable that, as shown in FIG. 15, a flat-surfaced mirror MF be disposed between the refractive optical system LG and the concave-surfaced mirror MR so that the projection optical system PO is so constructed as to bend the optical path in the direction substantially perpendicular to the oblique projection cross-section. With a construction like this, where the optical path is bent, even if the total length of the projection optical system including the concave-surfaced mirror is long, it is possible to shorten its dimension in the depth direction with respect to the screen. Moreover, it is possible to realize an optical construction slimmer in the thickness direction than in a case where the optical path is bent in a direction parallel to the oblique projection cross-section.

It is preferable that the refractive optical system disposed to the display element side of the concave-surfaced mirror be designed as a coaxial optical system. Adopting a coaxial refractive optical system helps simplify the lens barrel construction of the refractive optical system, leading to easier fabrication and reduced costs.

Figure 1:
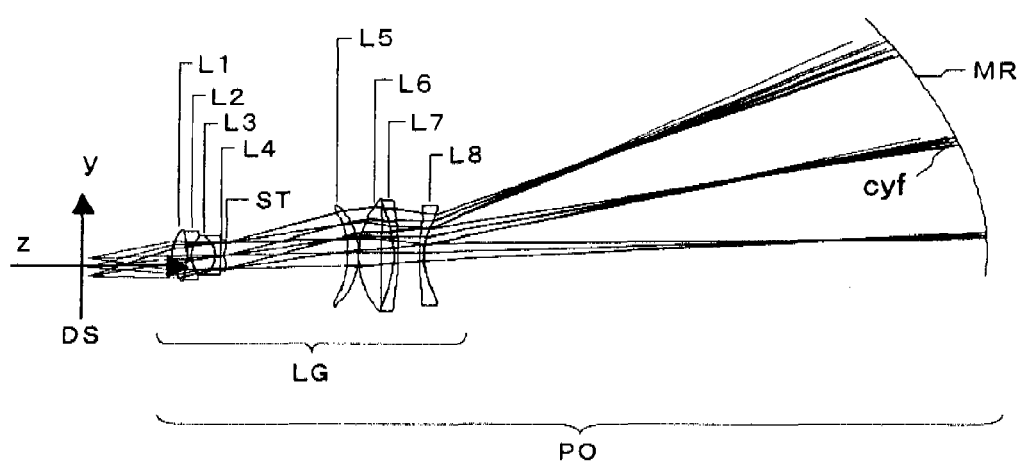
FIG. 1 is an optical path diagram showing the optical construction up to a concave-surfaced mirror in a first embodiment (Example 1) of the invention.
Figure 5:
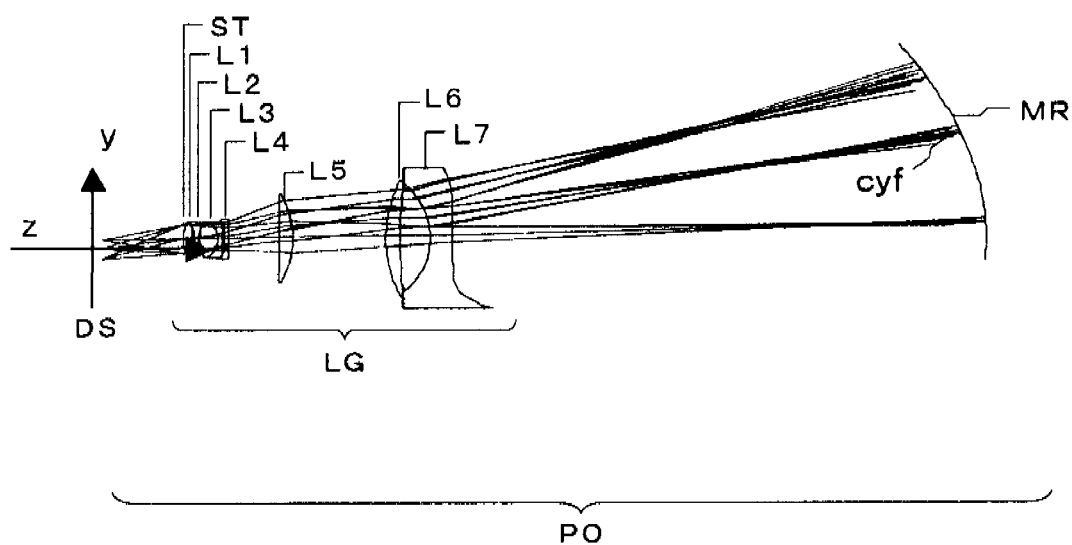
FIG. 5 is an optical path diagram showing the optical construction up to a concave-surfaced mirror in a second embodiment (Example 2) of the invention.
Figure 9:
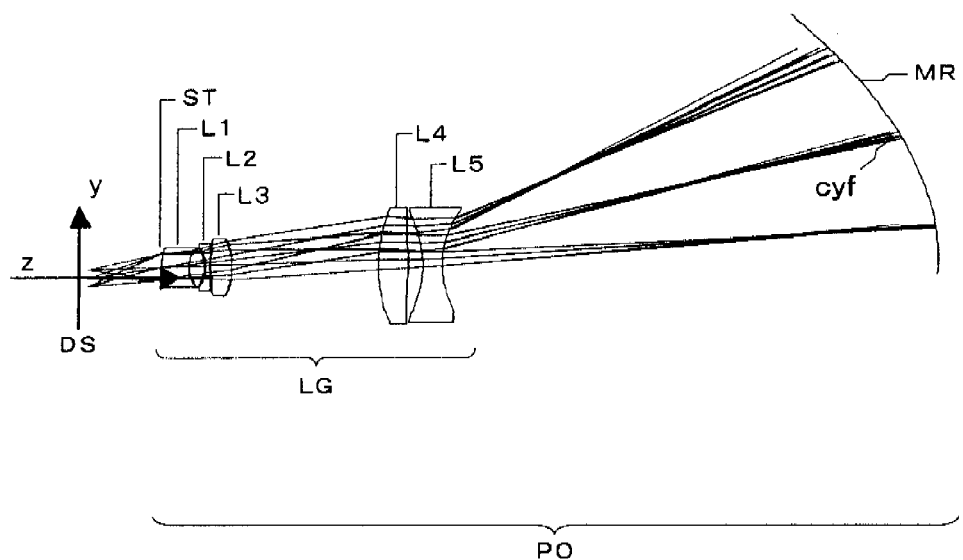
FIG. 9 is an optical path diagram showing the optical construction up to a concave-surfaced mirror in a third embodiment (Example 3) of the invention.

Now, a first to a third embodiment of the invention will be described as examples of specific optical constructions of projection optical systems according to the invention. FIGS. 1, 5, and 9 show the optical construction (optical arrangement, projection optical path, etc.) of the entire projection optical path from the display element DS to the concave-surfaced mirror MR in the first to third embodiments, respectively, as seen on an optical cross-section (shorter-side cross-section) in the direction of the longer sides of the image-display area of the display element DS. FIGS. 2A and 2B, 6A and 6B, and 10A and 10B show the optical construction (optical arrangement, projection optical path, etc.) of the entire projection optical path from the display element DS to the screen SC in the first to third embodiments, respectively, as seen on an optical cross-section (shorter-side cross-section) in the direction of the longer sides of the image-display area of the display element DS.

Figure 2A:
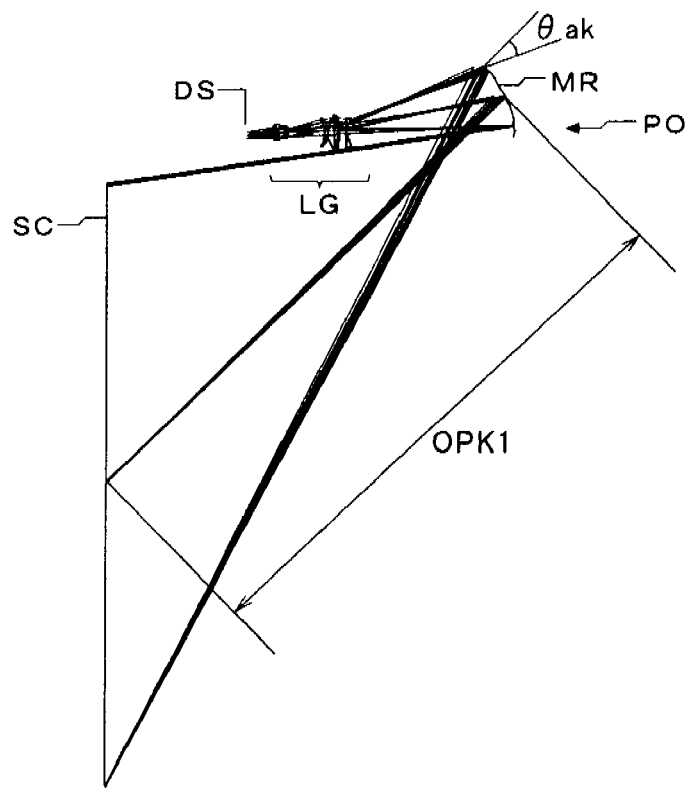
FIGS. 2A and 2B are optical path diagrams showing the optical construction up to a screen in the first embodiment (Example 1)
Figure 2B:
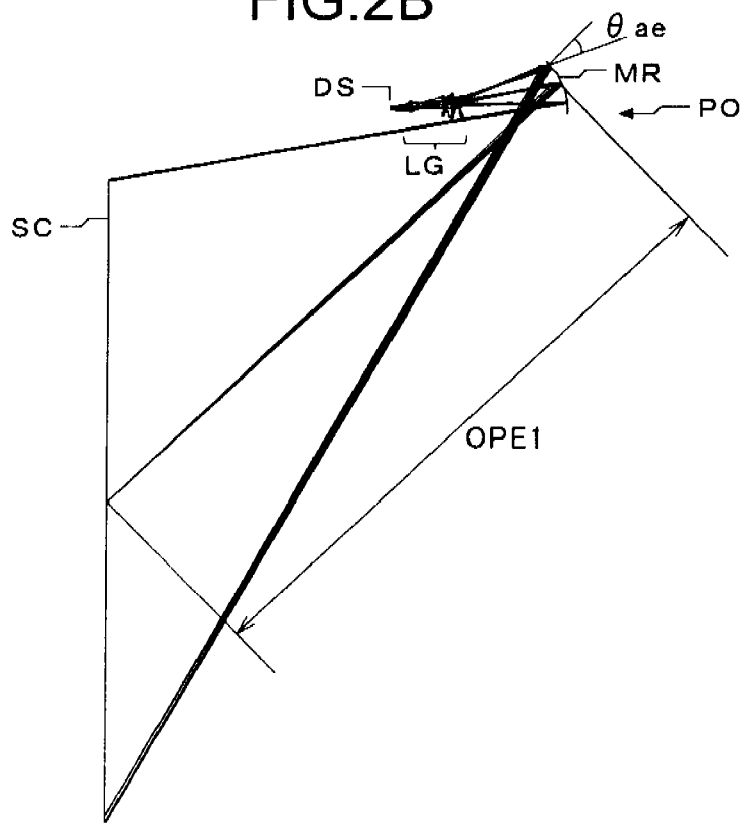
Figure 3A:
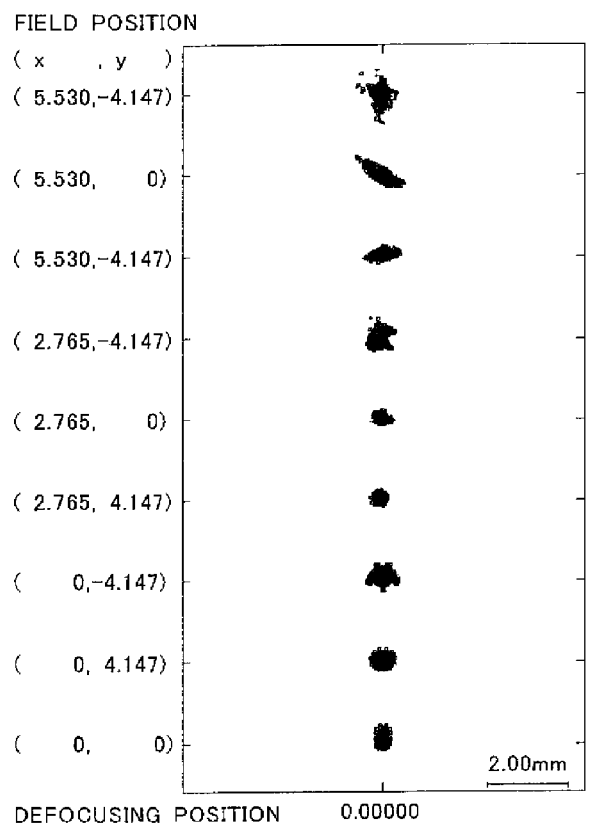
FIGS. 3A and 3B are spot diagrams of Example 1.
Figure 3B:
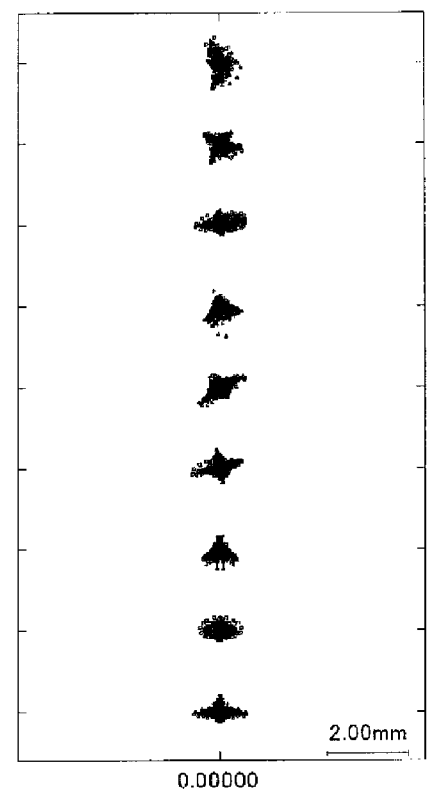
Figure 4A:
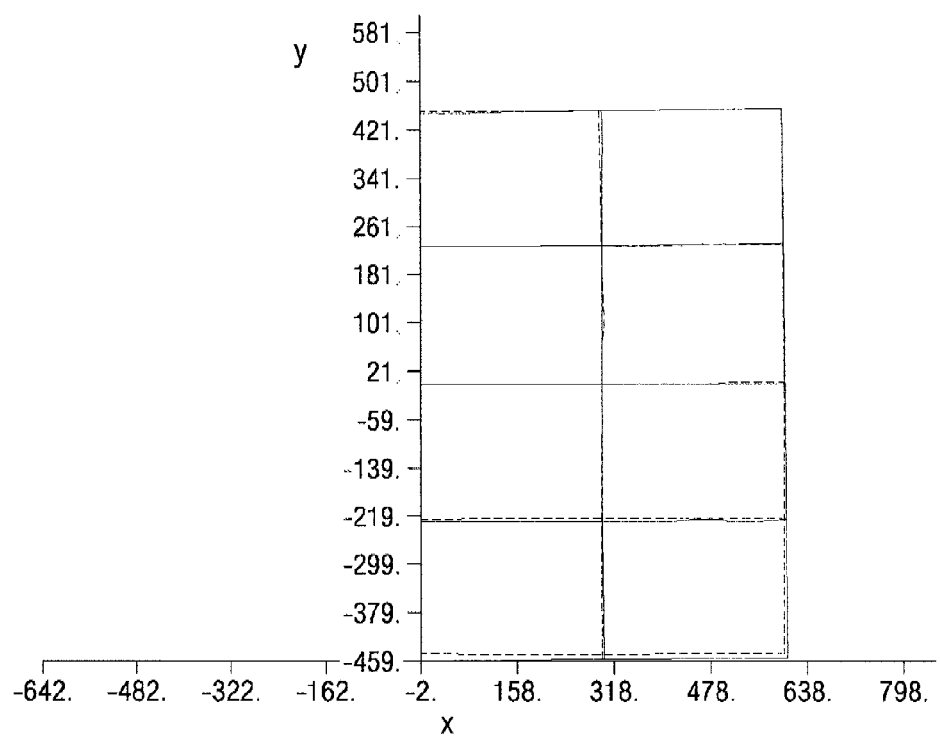
FIGS. 4A and 4B are distortion diagrams of Example 1.
Figure 4B:
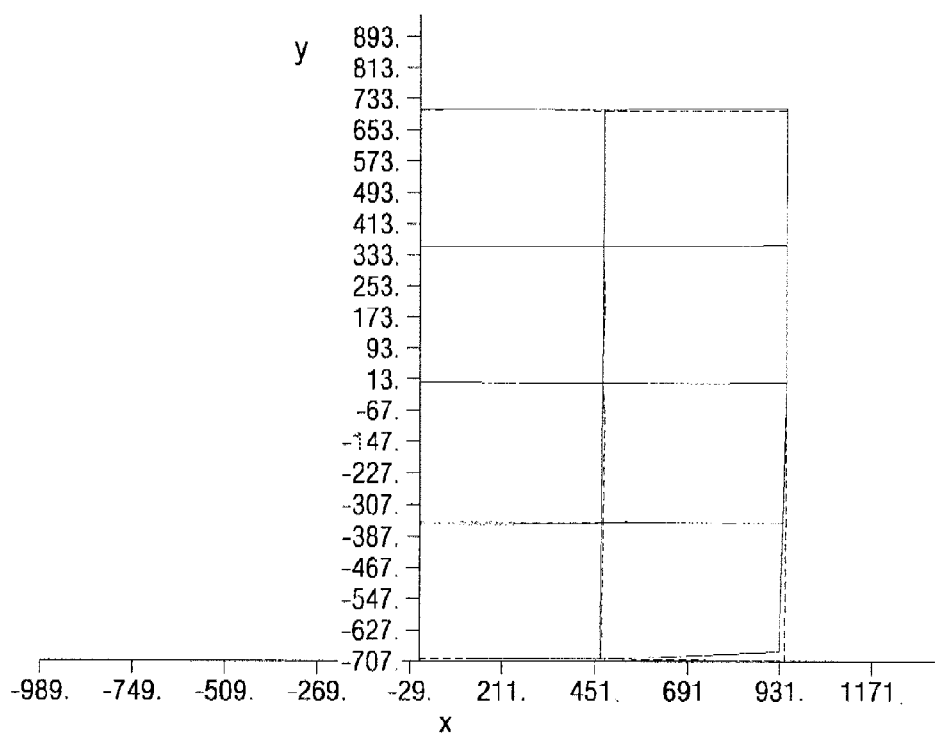
Figure 6A:
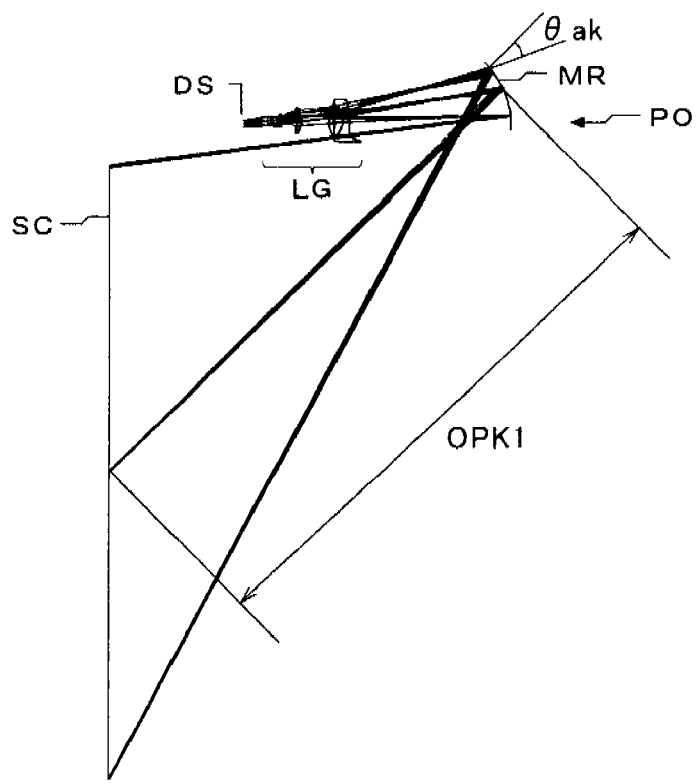
FIGS. 6A and 6B are optical path diagrams showing the optical construction up to a screen in the second embodiment (Example 2)
Figure 6B:
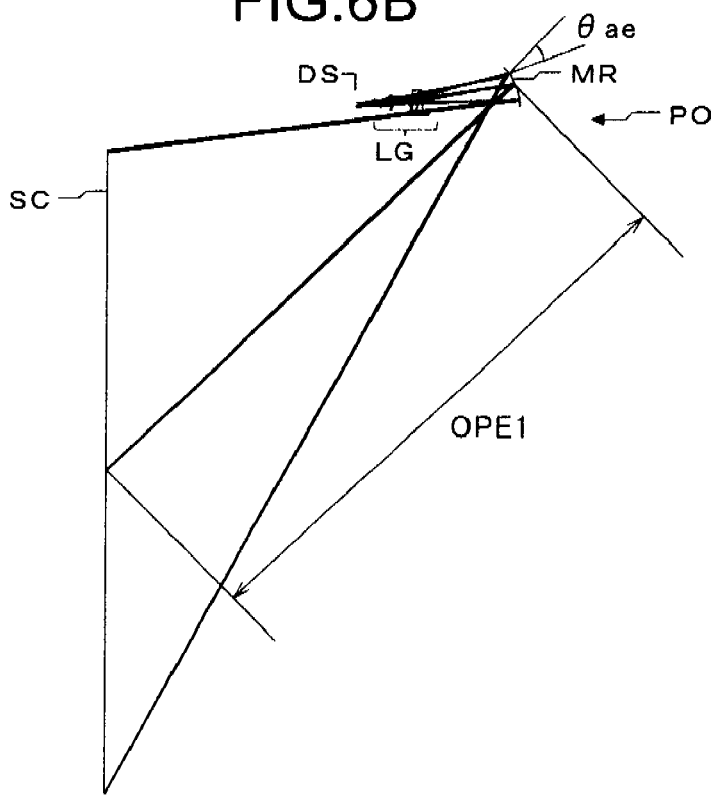
Figure 7A:
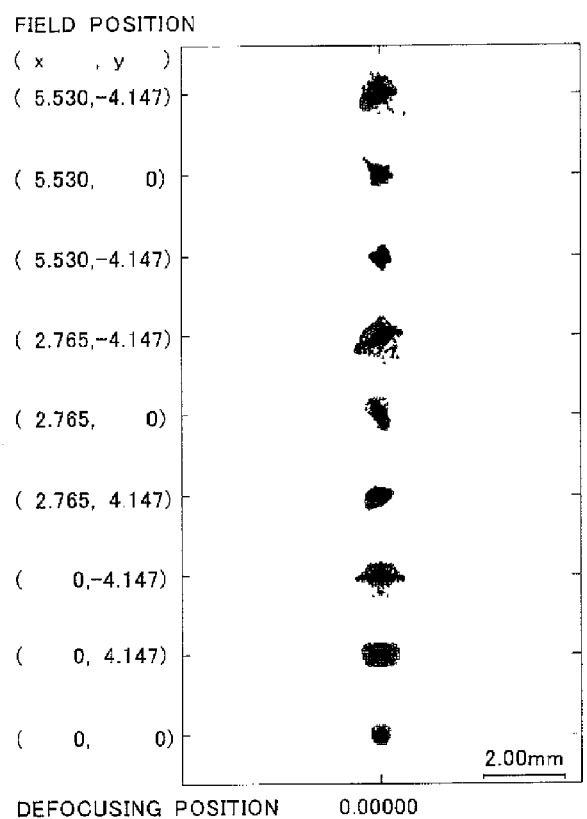
FIGS. 7A and 7B are spot diagrams of Example 2.
Figure 7B:
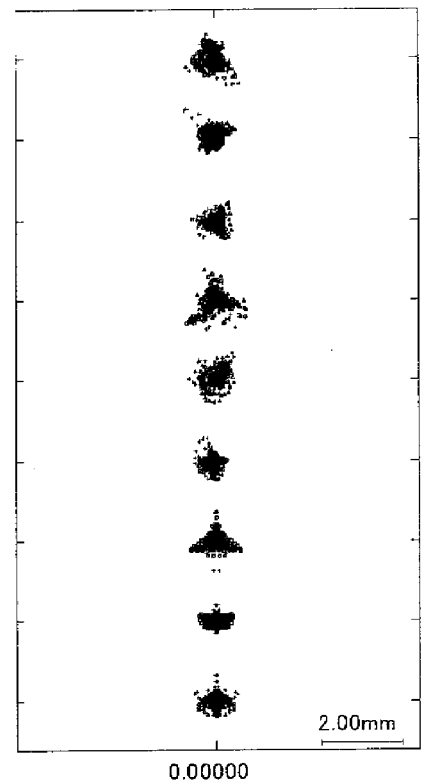
Figure 8A:
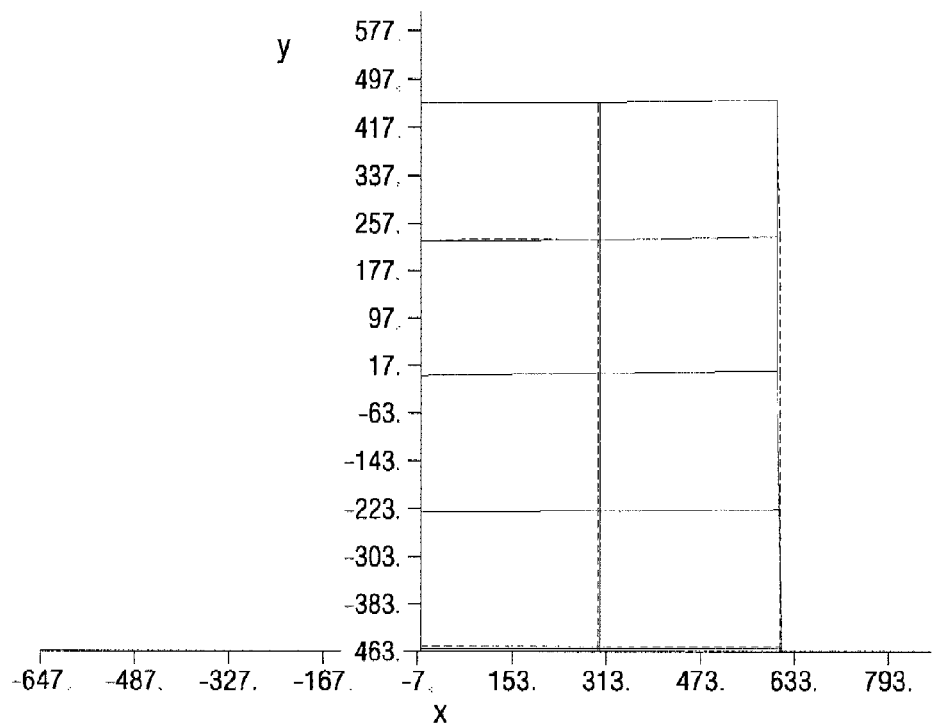
FIGS. 8A and 8B are distortion diagrams of Example 2.
Figure 8B:
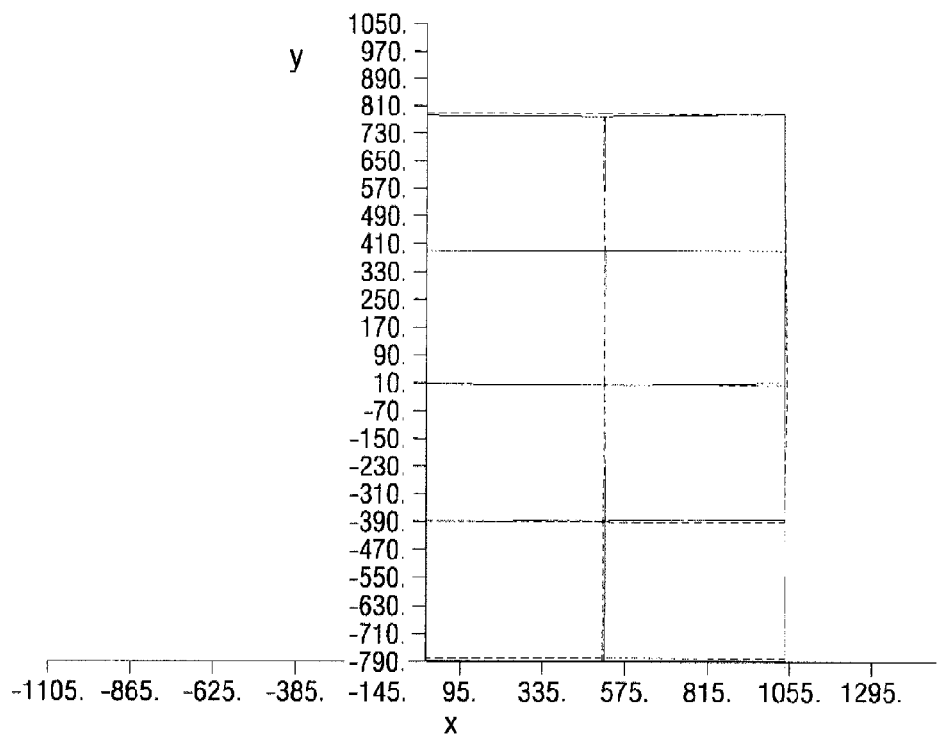
Figure 10A:
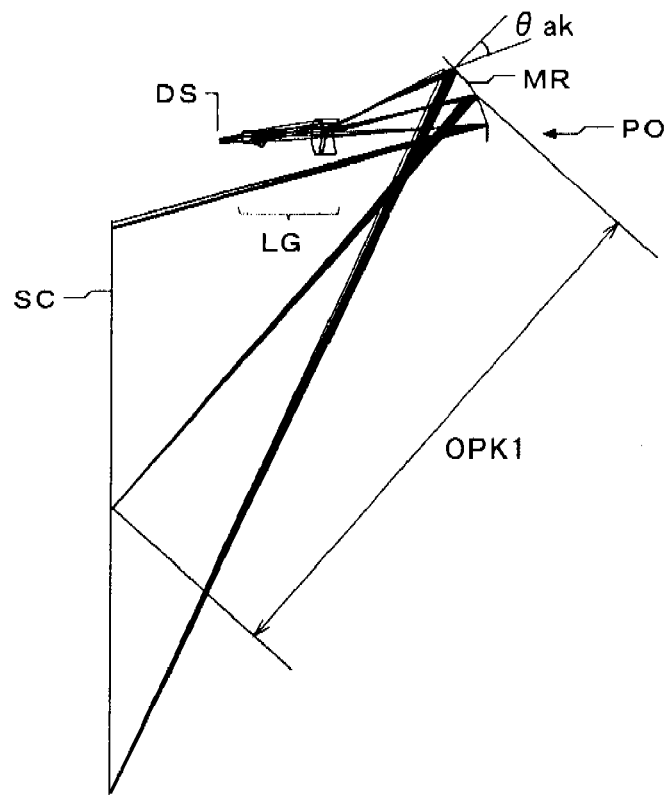
FIGS. 10A and 10B are optical path diagrams showing the optical construction up to a screen in the third embodiment (Example 3)
Figure 10B:
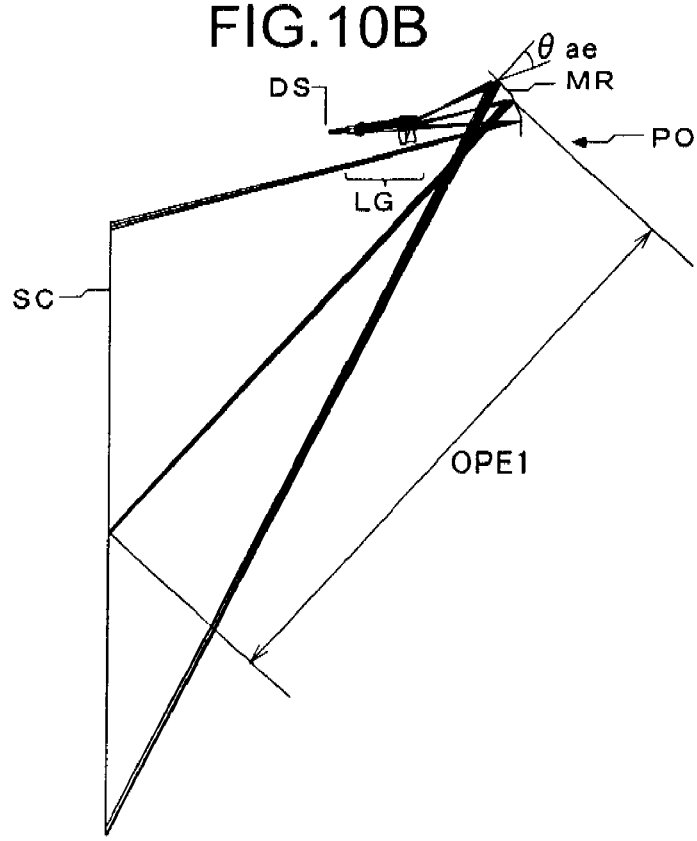
Figure 12A:
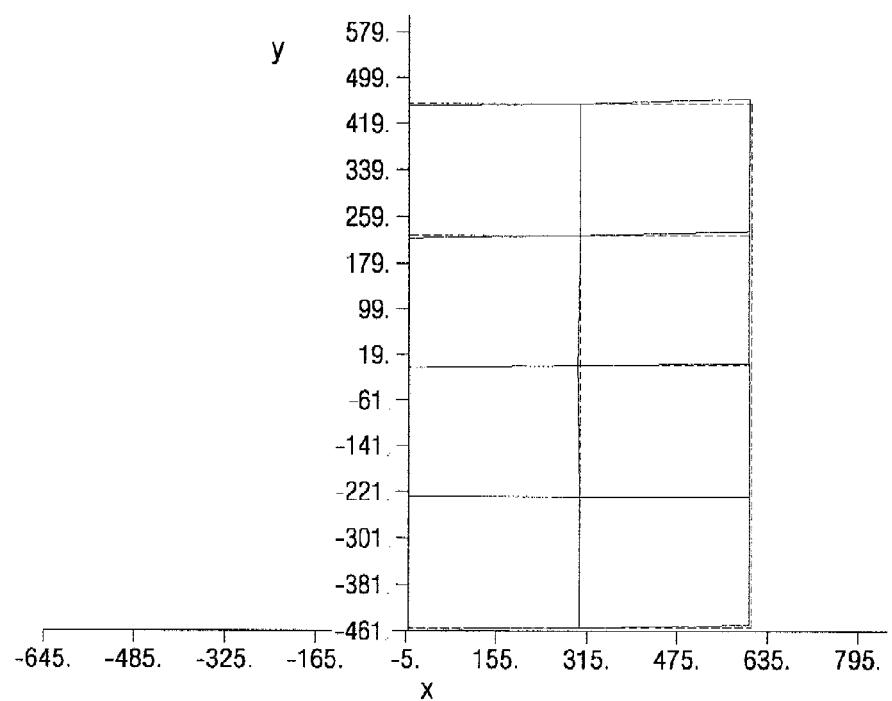
FIGS. 12A and 12B are distortion diagrams of Example 3.
Figure 12B:
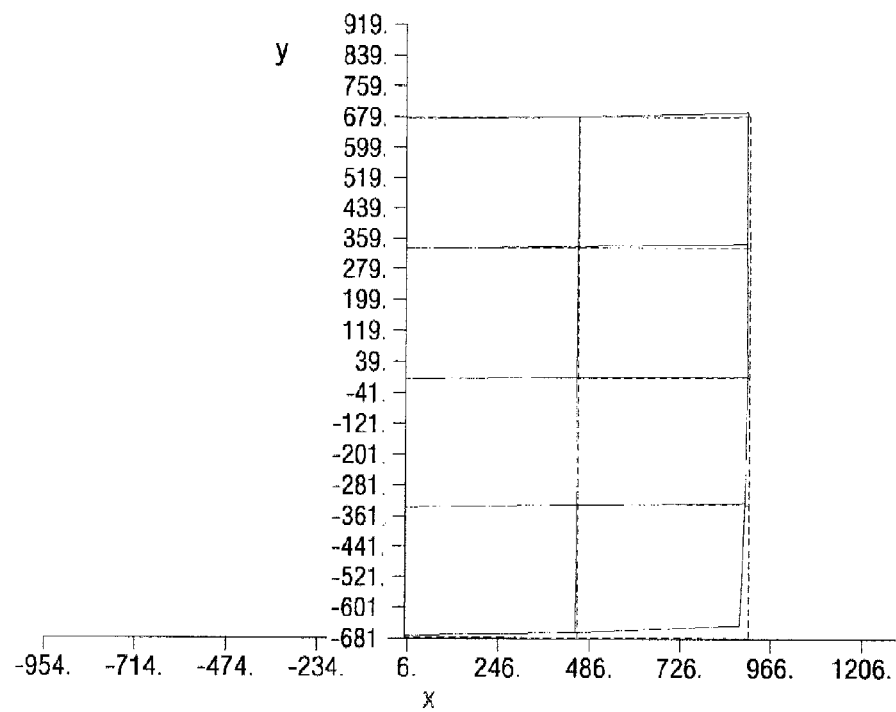

In FIGS. 1, 5, and 9, the symbol Li (i=1, 2, 3, . . . ) denotes the i-th lens as counted from the display element DS side (reduction side). FIGS. 2A, 6A, and 10A show the optical arrangement in the shortest-distance projection state of focusing, as seen on the optical cross-section, and FIGS. 2B, 6B, and 10B show the optical arrangement in a long-distance projection state of focusing, as seen on the optical cross-section. When the direction of a line normal to the image-display area of the display element DS is referred to as the z-direction, the direction of the shorter sides of the image-display area of the display element DS is referred to as the y-direction, and the direction of the longer sides of the image-display area of the display element DS is referred to as the x-direction, then, in the rectangular coordinate system (x, y, z) composed of these axes, FIGS. 1, 2A, and 2B, FIGS. 5, 6A, and 6B, and FIGS. 9, 10A, and 10B show the optical construction of the projection optical system PO of the first to third embodiments, respectively, as seen on the yz-cross-section.

In any of the first to third embodiments, the projection optical system PO is composed of, from the reduction side (display element DS side) to the enlargement side (screen SC side), a refractive optical system LG having a positive optical power (an optical power is a quantity defined as the reciprocal of a focal distance) and a concave-surfaced mirror MR, and is so constructed as to form an intermediate image between the refractive optical system LG and the concave-surfaced mirror MR and achieve focusing by moving at least the concave-surfaced mirror MR. The projection optical system PO is plane-symmetric about the yz-plane. Thus, the reflective surface of the concave-surfaced mirror MR has a plane-symmetric shape, the plane of symmetry being the yz-plane. The optical construction of each embodiment will now be described in more detail.

In the first embodiment (FIGS. 1, 2A, and 2B), the refractive optical system LG is composed of, from the display element DS side, a first L1 to an eighth lens L8. The first lens L1 is a biconvex positive lens (having rotation-symmetric aspherical surfaces on both sides thereof). The second lens L2 is a biconcave negative lens. The third lens L3 is a cemented lens composed of a biconvex positive lens and a negative meniscus lens concave to the display element DS side. The fourth lens L4 is a positive meniscus lens (having a rotation-symmetric aspherical surface on the reduction side thereof) convex to the display element DS side. To the fifth lens L5 side of the fourth lens L4, there is disposed an aperture stop ST. The fifth lens L5 is a positive meniscus lens concave to the display element DS side. The sixth lens L6 is a biconvex positive lens. The seventh lens L7 is a negative meniscus lens (having rotation-symmetric aspherical surfaces on both sides thereof) concave to the display element DS side. The eighth lens L8 is a negative meniscus lens (having rotation-symmetric aspherical surfaces on both sides thereof) convex to the display element DS side. To the screen SC side of the refractive optical system LG, there is disposed a concave-surfaced mirror MR having as a reflective surface thereof a free-form curved surface. For focusing from a short-distance projection state to a long-distance projection state, the refractive optical system LG moves toward the enlargement side, and the concave-surfaced mirror MR moves toward the reduction side.

In the second embodiment (FIGS. 5, 6A, and 6B), the refractive optical system LG is composed of, from the display element DS side, an aperture stop ST and a first L1 to a seventh lens L7. The first lens L1 is a biconvex positive lens (having rotation-symmetric aspherical surfaces on both sides hereof). The second lens L2 is a biconcave negative lens. The third lens L3 is a cemented lens composed of a biconvex positive lens and a negative meniscus lens concave to the display element DS side. The fourth lens L4 is a biconcave negative lens (having rotation-symmetric aspherical surfaces on both sides). The fifth lens L5 is a positive meniscus lens concave to the display element DS side. The sixth lens L6 is a positive meniscus lens convex to the display element DS side. The seventh lens L7 is a negative meniscus plastic lens (having a rotation-symmetric aspherical surface on the reduction side thereof and having a free-form curved surface on the enlargement side thereof) concave to the display element DS side. To the screen SC side of the refractive optical system LG, there is disposed a concave-surfaced mirror MR having as a reflective surface thereof a free-form curved surface. For focusing from a short-distance projection state to a long-distance projection state, the fifth to seventh lenses L5 to L7 move toward the enlargement side, and the concave-surfaced mirror MR moves toward the reduction side.

In the third embodiment (FIGS. 9, 10A, and 10B), the refractive optical system LG is composed of, from the display element DS side, an aperture stop ST and a first L1 to a fifth lens L5. The first lens L1 is a cemented lens (having a rotation-symmetric aspherical surface at the reduction-side end thereof) composed of a negative meniscus lens convex to the display element DS side and a biconvex positive lens. The second lens L2 is a biconcave negative lens. The third lens L3 is a biconvex positive lens (having rotation-symmetric aspherical surfaces on both sides thereof). The fourth lens L4 is a biconvex positive lens. The fifth lens L5 is a biconcave negative plastic lens (having an extended aspherical surface on the reduction side and a free-form curved surface on the enlargement side). To the screen SC side of the refractive optical system LG, there is disposed a concave-surfaced mirror MR having as a reflective surface thereof a free-form curved surface. For focusing from a short-distance projection state to a long-distance projection state, the fourth and fifth lenses L4 and L5 move toward the enlargement side, and the concave-surfaced mirror MR moves toward the reduction side.

The first to third embodiments (FIGS. 1, 2A, and 2B, FIGS. 5, 6A, and 6B, and FIGS. 9, 10A, and 10B) all deal with a projection optical system for use in an image projection apparatus that projects, while enlarging, a displayed image onto a screen surface. Accordingly, the image-display area of the display element DS corresponds to an image forming surface that forms a two-dimensional image by modulation of light intensity or any other method, and the screen SC corresponds to a projected-image area. The embodiments each assume the use of a digital micromirror device as the display element DS. This, however, is not meant to limit the type of the display element used here to any particular one; any other type of non-self-luminous, reflective (or transmissive) display element (for example, a liquid crystal display element) may instead be used that is suitable for the projection optical system PO of each embodiment. In a case where a digital micromirror device is used as a display element, the light incident thereon is spatially modulated by being reflected on a plurality micromirrors that are individually switched between on and off states (for example, states in which they are inclined at angles of ±12° respectively). Here, only the light reflected on the micromirrors in their on state enters the projection optical system so as to be projected onto the screen SC.

As will be understood from the above description, the embodiments described above and the examples presented later cover projection optical systems and image projection apparatuses constructed as described below. With these constructions, it is possible to achieve short-distance projection with a combination of a refractive optical system having a positive optical power and a concave-surfaced mirror, and it is possible, with an optical construction that achieves refocusing by making rays incident on the screen at a small angle of incidence that fulfills a predetermined condition, to reduce the variation of the projection position resulting from a variation in the projection distance. Moreover, incorporating a focusing mechanism makes it possible to obtain a satisfactory projected image at appropriate projection distances. Thus, it is possible to realize a compact, high-performance design that produces, in short-distance front projection, a satisfactory projected image with a size in the range of about 60 to 100 inches owing to focusing, for coping with a variation in the projection distance, being performed with minimum up/down movement of the image in the height direction.

(T1) A projection optical system that projects an image on a display element surface onto a screen surface with enlargement, wherein the projection optical system includes, from the enlargement side thereof, a refractive optical system having a positive optical power and a concave-surfaced mirror, forms an intermediate image in the space between the refractive optical system and the concave-surfaced mirror, includes at least one optical element that is moved to achieve focusing, has a plane-symmetric surface as the reflective surface of the concave-surfaced mirror, and fulfills conditional formula (1) above.

(T2) The projection optical system described at (T1) above, wherein the projection optical system fulfills at least one of conditional formulae (2), (3), (3a), (4), (4a), (5), (6), (6a), (7), (8), and (9).

(T3) The projection optical system described at (T1) or (T2) above, wherein, as a mirror having an optical power, only the concave-surfaced mirror is disposed at the screen-side end.

(T4) The projection optical system described at any one of (T1) to (T3) above, wherein the concave-surfaced mirror is moved for focusing.

(T5) The projection optical system described at any one of (T1) to (T4) above, wherein the projection optical system further comprises, disposed between the display element surface and the screen surface, a flat-surfaced mirror for bending the optical path.

(T6) The projection optical system described at any one of (T1) to (T5) above, wherein the refractive optical system further includes at least one plastic lens.

(T7) The projection optical system described at any one of (T1) to (T6) above, wherein the refractive optical system includes at least one refractive surface that has a free-form curved surface.

(T8) The projection optical system described at any one of (T1) to (T7) above, wherein the concave-surfaced mirror includes at least one reflective surface that has a free-form curved surface.

(U1) An image projection apparatus including a display element that forms a two-dimensional image and a projection optical system that projects the image on the display element surface onto a screen surface with enlargement, wherein the projection optical system includes, from the enlargement side thereof, a refractive optical system having a positive optical power and a concave-surfaced mirror, forms an intermediate image in the space between the refractive optical system and the concave-surfaced mirror, includes at least one optical element that is moved to achieve focusing, has a plane-symmetric surface as the reflective surface of the concave-surfaced mirror, and fulfills conditional formula (1) above.

(U2) The image projection apparatus described at (U1) above, wherein the image projection apparatus fulfills at least one of conditional formulae (2), (3), (3a), (4), (4a), (5), (6), (6a), (7), (8), and (9).

(U3) The image projection apparatus described at (U1) or (U2) above, wherein, as a mirror having an optical power, only the concave-surfaced mirror is disposed at the screen-side end.

(U4) The image projection apparatus described at any one of (U1) to (U3) above, wherein the concave-surfaced mirror is moved for focusing.

(U5) The image projection apparatus described at any one of (U1) to (U4) above, wherein the image projection apparatus further comprises, disposed between the display element surface and the screen surface, a flat-surfaced mirror for bending the optical path.

(U6) The image projection apparatus described at any one of (U1) to (U5) above, wherein the refractive optical system further includes at least one plastic lens.

(U7) The image projection apparatus described at any one of (U1) to (U6) above, wherein the refractive optical system includes at least one refractive surface that has a free-form curved surface.

(U8) The image projection apparatus described at any one of (U1) to (U7) above, wherein the concave-surfaced mirror includes at least one reflective surface that has a free-form curved surface.

(U9) The image projection apparatus described at any one of (U1) to (U8) above, wherein the image projection apparatus further comprises an illumination optical system that illuminates the display element surface.

EXAMPLES

Hereinafter, practical examples of projection optical systems etc. according to the invention will be presented more specifically with reference to their construction data etc. Examples 1 to 3 presented below are numerical examples corresponding to the first to third embodiments, respectively, described above, and thus the optical construction diagrams, optical path diagrams, etc. (FIGS. 1, 2A, and 2B, FIGS. 5, 6A, and 6B, and FIGS. 9, 10A, and 10B) showing the first to third embodiments also show the optical arrangement, projection optical path, etc. of the corresponding ones of Examples 1 to 3.

Tables 1 to 5, Tables 6 to 10, and Tables 11 to 16 show the construction data of Examples 1 to 3, respectively. Table 17 shows, for each example, the data corresponding to and related to the relevant conditional formulae ($\beta x$ represents the image magnification in the direction of the longer sides of the image-display area, and $\beta y$ represents the image magnification in the direction of the shorter sides of the image-display area). Tables 1, 6, and 11 show the basic optical constructions through the entire optical system from the display element surface (S1, the image-display area on the display element DS, corresponding to the object surface) on the reduction side to the screen surface (the projected-image area on the screen SC, corresponding to the image surface) on the enlargement side. In these tables, the symbol Si (i=1, 2, 3, . . . ) represents the i-th surface as counted from the reduction side, and the symbol ri (i=1, 2, 3, . . . ) represents the radius of curvature (mm) of surface Si; di (i=1, 2, 3, . . . ) represents the axial distance (mm; for a distance between eccentric surfaces, given as eccentric data) between surface Si and surface Si+1, and Ni (i=1, 2, 3, . . . ) and vi (i=1, 2, 3, . . . ) represent the index of refraction (Nd) for the d-line and the Abbe number (vd), respectively, of the optical material filling the distance di. With respect to surface S11 in Table 1, surface S2 in Table 6, and surface S2 in Table 11, R represents the radius of aperture (mm).

For each surface that is eccentric relative to the surface immediately preceding it—the one located on the reduction-side thereof—, its eccentricity data is shown in tables 4, 9, and 15. In a rectangular coordinate system (x, y, z) representing eccentricity data, the position of a translationally eccentric surface is represented by the coordinates (XDE, YDE, ZDE)= (the translational eccentricity (mm) in the x-axis direction, the translational eccentricity (mm) in the y-axis direction, the translational eccentricity (mm) in the z-axis direction) of the vertex of the surface relative to the origin (0, 0, 0) defined as the center of the object surface S1 parallel to the xy-plane (i.e. relative to object surface) or as a point displaced in the z-direction by the axial distance (central thickness) from the vertex of the immediately preceding surface (i.e. ordinary eccentricity). Moreover, the inclination (rotational eccentricity) of the surface is represented by the rotation angles ADE, BDE, CDE (°) about the x-, y-, and z-axis, respectively, with respect to the vertex of the surface. Different eccentricity values are listed in the following order: XDE, YDE, ZDE, ADE, BDE, and CDE.

Tables 5, 10, and 16 show focus data, that is, the focus positions in the shortest-distance and long-distance projection states of any axial distance di or surface vertex coordinate (XDE, YDE, ZDE) that varies as focusing is performed in Examples 1 to 3. No data is therefore listed for a distance or coordinate that does not vary as focusing is performed.

A surface Si having a rotation-symmetric aspherical surface is defined by formula (AS) below using the local rectangular coordinate system (x, y, z) having its origin at the vertex of the surface. Tables 2, 7, and 12 show the data of aspherical surfaces in Examples 1 to 3. The coefficient of any term that does not appear in the tables is 0, and, for all the data, "E-n" stands for "×10$^{-n}$".

$$z=(c \cdot h^2)/[1+\{1-(1+K) \cdot c^2 \cdot h^2\}^{1/2}]+A \cdot h^4+B \cdot h^6+C \cdot h^8+D \cdot h^{10}+E \cdot h^{12}+F \cdot h^{14}+G \cdot h^{16}+H \cdot h^{18}+J \cdot h^{20} \quad (AS)$$

where z represents the displacement in the z-axis direction at the height h (relative to the vertex);

h represents the height in a direction perpendicular to the z-axis ($h^2=x^2+y^2$);

c represents the curvature (=1/ri) at the vertex;

K represents the coefficient of conicity; and

A, . . . , J represent coefficients of asphericity.

A surface Si having an extended aspherical surface is defined by formula (BS) below using the local rectangular coordinate system (x, y, z) having its origin at the vertex of the surface. Table 13 shows the data of the extended aspherical surface in Example 3. The coefficient of any term that does not appear in the table is 0, and, for all the data, "E-n" stands for "×10$^{-n}$".

$$z=(CUX \cdot x^2+CUY \cdot y^2)/[1+\{1-(1+KX) \cdot CUX^2 \cdot x^2-(1+KY) \cdot CUY^2 \cdot y^2\}^{1/2}]+AR \cdot \{(1-AP) \cdot x^2+(1+AP) \cdot y^2\}^2+BR \cdot \{(1-BP) \cdot x^2+(1+BP) \cdot y^2\}^3+CR \cdot \{(1-CP) \cdot x^2+(1+CP) \cdot y^2\}^4+DR \cdot \{(1-DP) \cdot x^2+(1+DP) \cdot y^2\}^5 \quad (BS)$$

where x, y represent the rectangular coordinates on a plane perpendicular to the z-axis;

z represents the displacement in the z-axis direction at the position having the coordinates (x, y) (relative to the vertex);

CUX represents the curvature (=1/RDX) in the x-axis direction at the vertex;

CUY represents the curvature (=1/RDY) in the y-axis direction at the vertex;

KX represents the coefficient of conicity in the x-axis direction;

KY represents the coefficient of conicity in the y-axis direction;

AR, BR, CR, DR represent the rotation-symmetric components of the coefficients of deformation of orders 4, 6, 8, and 10 with respect to a cone; and AP, BP, CP, DP represent the non-rotation-symmetric components of the coefficients of deformation of orders 4, 6, 8, and 10 with respect to a cone.

A surface Si having a free-form curved surface is defined by formula (CS) below using the local rectangular coordinate system (x, y, z) having its origin at the vertex of the surface. Tables 3, 8, and 14 show the data of polynomial free-form curved surfaces in Examples 1 to 3. The coefficient of any term that does not appear in the tables is 0; for any free-form curved surface, K=0 in both the x- and y-direction; for all the data, "E-n" stands for "×10$^{-n}$".

$$z=(c \cdot h^2)/[1+\{1-(1+K) \cdot c^2 \cdot h^2\}^{1/2}]+\Sigma\{C(j,k) \cdot x^j \cdot y^k\} \quad (CS)$$

where z represents the displacement in the z-axis direction at the height h (relative to the vertex);

h represents the height in a direction perpendicular to the z-axis ($h^2=x^2+y^2$);

c represents the curvature (=1/ri) at the vertex;

K represents the coefficient of conicity; and

C(j, k) represents the polynomial free-from curved surface coefficient of order j with respect to x and of order k with respect to y.

The optical performance of Examples 1 to 3 is shown in the form of spot diagrams (FIGS. 3A and 3B, FIGS. 7A and 7B, and FIGS. 11A and 11B) and distortion diagrams (FIGS. 4A and 4B, FIGS. 8A and 8B, and FIGS. 12A and 12B). FIGS. 3A, 7A, and 11A and FIGS. 4A, 8A, and 12A show the optical performance in the shortest-distance projection state of focusing, and FIGS. 3B, 7B, and 11B and FIGS. 4B, 8B, and 12B show the optical performance in a long-distance projection state of focusing. The spot diagrams show the imaging performance (mm) on the screen surface SC for each of the following three wavelengths: the C-line (with a wavelength of 656.3 nm), the d-line (with a wavelength of 587.6 nm), and the g-line (with a wavelength of 435.8 nm). The distortion diagrams show the ray positions (mm) on the screen surface SC corresponding to a rectangular grid (with the x-axis direction aligned with the direction of the longer sides of the image and the y-axis direction aligned with the direction of the shorter sides of the image) on the display element surface DS, with solid lines representing the distorted grid as actually observed in each example and broken lines representing the grid (without distortion) of the ideal image points with consideration given to the anamorphic ratio.

TABLE 1

| | Example 1 | | | | |
|---|---|---|---|---|---|
| Si | ri[mm] | di[mm] | Ni | vi | Elements etc. |
| S1 | ∞ | — | | | DS(Object Surface) |
| S2 | 20.132 | 6.456 | 1.7985 | 22.6000 | L1 LG |
| S3 | −39.045 | 0.100 | | | |
| S4 | −36.330 | 2.000 | 1.8272 | 30.4315 | L2 |
| S5 | 11.828 | 0.100 | | | |
| S6 | 11.920 | 10.624 | 1.7001 | 53.6056 | L3 |
| S7 | −10.194 | 2.000 | 1.8000 | 27.9826 | |
| S8 | −867.377 | 0.100 | | | |
| S9 | 73.018 | 2.141 | 1.8496 | 37.2485 | L4 |
| S10 | 196.459 | 0.100 | | | |
| S11 | ∞(R = 6.037) | 54.711 | | | ST |
| S12 | −40.729 | 4.721 | 1.5224 | 52.1590 | L5 |
| S13 | −31.565 | 0.100 | | | |
| S14 | 39.141 | 10.300 | 1.7120 | 32.3910 | L6 |
| S15 | −11388.747 | 5.265 | | | |
| S16 | −41.197 | 2.000 | 1.8500 | 40.0400 | L7 |
| S17 | −101.010 | 9.454 | | | |
| S18 | 69.403 | 2.000 | 1.8500 | 40.0400 | L8 |
| S19 | 29.552 | — | | | |
| S20 | ∞ | — | | | MR |
| S21 | ∞ | | | | SC(Image Surface) |

TABLE 2

Example 1

Aspherical Surface Data of Si

| | S2 | S3 | S9 | S16 | S17 | S18 | S19 |
|---|---|---|---|---|---|---|---|
| K | 0.000000 | 0.000000 | 0.000000 | 0.000000 | 0.000000 | 0.000000 | 0.000000 |
| A | 0.834458E−05 | −0.399859E−05 | −0.244334E−04 | 0.466551E−05 | 0.148794E−05 | −0.844658E−05 | −0.958125E−05 |
| B | 0.427471E−07 | 0.518118E−07 | −0.566597E−07 | 0.711277E−08 | 0.544173E−09 | −0.773731E−08 | −0.473336E−08 |
| C | 0.216815E−09 | 0.113557E−09 | 0.966351E−09 | −0.542348E−11 | 0.580986E−11 | 0.112822E−10 | 0.483392E−11 |
| D | 0.117268E−11 | −0.272722E−11 | −0.286098E−10 | −0.505089E−16 | −0.722306E−14 | −0.278355E−14 | −0.399217E−14 |

TABLE 3

Example 1
Polynomial Free-Form Curved Surface Data of S20: C(j, k)

| C(2, 0) | −5.5609E−03 | C(0, 2) | −5.8573E−03 | C(2, 1) | 3.2922E−06 |
|---|---|---|---|---|---|
| C(0, 3) | 2.6495E−05 | C(4, 0) | 1.2304E−07 | C(2, 2) | 1.6542E−07 |
| C(0, 4) | −7.7243E−07 | C(4, 1) | −1.0393E−09 | C(2, 3) | −2.8043E−10 |
| C(0, 5) | 1.6226E−08 | C(6, 0) | −1.0567E−11 | C(4, 2) | −1.4404E−11 |
| C(2, 4) | −3.1259E−11 | C(0, 6) | −1.8509E−10 | C(6, 1) | 1.2338E−13 |
| C(4, 3) | 2.1835E−13 | C(2, 5) | 3.2513E−13 | C(0, 7) | 1.0750E−12 |
| C(8, 0) | 3.0854E−16 | C(6, 2) | −5.4614E−16 | C(4, 4) | −8.8639E−16 |
| C(2, 6) | −1.0928E−15 | C(0, 8) | −2.5386E−15 | | |

TABLE 4

Example 1

Eccentricity Data
(Shortest-Distance Projection State)

| | S2 Coordinates Relative to Object Surface | S20 Coordinates Relative to Object Surface | S21 (Image Surface) Coordinates Relative to Object Surface |
|---|---|---|---|
| XDE | 0.000000 | 0.000000 | 0.000000 |
| YDE | 5.000000 | 6.163751 | 5.000000 |
| ZDE | 37.706100 | 400.963020 | −208.660000 |
| ADE | 0.000000 | 0.000000 | 0.000000 |
| BDE | 0.000000 | 0.000000 | 0.000000 |
| CDE | 0.000000 | 0.000000 | 0.000000 |

TABLE 5

Example 1

Focus Data

| | | Shortest-Distance Projection State | Long-Distance Projection State |
|---|---|---|---|
| S2 | ZDE | 37.706 | 37.923 |
| S20 | YDE | 6.164 | 4.433 |
| | ZDE | 400.963 | 384.208 |
| S21 | ZDE | −208.660 | −608.660 |

TABLE 6

Example 2

| Si | ri[mm] | di[mm] | Ni | vi | Elements etc. |
|---|---|---|---|---|---|
| S1 | ∞ | — | | | DS(Object Surface) |
| S2 | ∞(R = 6.524) | 10.000 | | | ST    LG |
| S3 | 18.393 | 4.336 | 1.7985 | 22.6000 | L1 |
| S4 | −35.987 | 0.700 | | | |
| S5 | −21.267 | 2.116 | 1.8478 | 27.6881 | L2 |
| S6 | 37.212 | 0.100 | | | |
| S7 | 17.542 | 8.554 | 1.6750 | 54.7195 | L3 |
| S8 | −9.461 | 2.000 | 1.8467 | 23.8200 | |
| S9 | −118.178 | 1.000 | | | |
| S10 | −69.796 | 2.000 | 1.8466 | 23.8200 | L4 |
| S11 | 122.467 | d11 | | | |
| S12 | −275.264 | 5.770 | 1.7167 | 25.7272 | L5 |
| S13 | −41.568 | 42.223 | | | |
| S14 | 53.581 | 6.732 | 1.5148 | 54.6886 | L6 |
| S15 | 226.477 | 13.529 | | | |
| S16 | −32.804 | 10.000 | 1.4927 | 57.4912 | L7 |
| S17 | ∞ | — | | | (Plastic) |
| S18 | ∞ | — | | | MR |
| S19 | ∞ | | | | SC(Image Surface) |

TABLE 7

Example 2

Aspherical Surface Data of Si

| | S3 | S4 | S10 | S11 | S16 |
|---|---|---|---|---|---|
| K | 0.000000 | 0.000000 | 0.000000 | 0.000000 | 0.000000 |
| A | 0.412839E−04 | 0.275339E−05 | −0.224668E−03 | −0.129860E−03 | −0.577203E−05 |
| B | 0.172701E−06 | −0.195493E−06 | −0.327099E−06 | 0.288758E−06 | 0.237159E−08 |
| C | 0.675184E−09 | 0.334461E−09 | 0.369773E−08 | 0.691835E−08 | 0.640995E−11 |
| D | 0.130515E−10 | −0.152543E−10 | 0.225729E−10 | −0.333774E−10 | −0.485878E−14 |

TABLE 8

Example 2

Polynomial Free-Form Curved Surface Data of S17: C(j, k)

| C(2, 0) | 2.0183E−03 | C(0, 2) | 2.0041E−03 | C(2, 1) | 3.8493E−07 |
|---|---|---|---|---|---|
| C(0, 3) | −2.9926E−06 | C(4, 0) | −9.5736E−06 | C(2, 2) | −1.9827E−05 |
| C(0, 4) | −8.6142E−06 | C(4, 1) | 1.7982E−09 | C(2, 3) | 2.8123E−08 |
| C(0, 5) | −1.1879E−07 | C(6, 0) | 5.1358E−09 | C(4, 2) | 1.9820E−08 |
| C(2, 4) | 2.0904E−08 | C(0, 6) | 1.2805E−08 | C(6, 1) | −1.9905E−11 |
| C(4, 3) | −3.2837E−10 | C(2, 5) | −3.1409E−10 | C(0, 7) | −2.1250E−10 |
| C(8, 0) | −1.3200E−12 | C(6, 2) | −7.8352E−12 | C(4, 4) | −4.4366E−12 |
| C(2, 6) | −3.0058E−12 | C(0, 8) | 2.3399E−13 | | |

Polynomial Free-Form Curved Surface Data of S18: C(j, k)

| C(2, 0) | −5.5044E−03 | C(0, 2) | −4.9486E−03 | C(2, 1) | 3.1187E−06 |
|---|---|---|---|---|---|
| C(0, 3) | −2.9696E−05 | C(4, 0) | 2.4064E−08 | C(2, 2) | −5.2581E−08 |
| C(0, 4) | 8.3155E−07 | C(4, 1) | −3.8256E−10 | C(2, 3) | 4.9609E−09 |
| C(0, 5) | −8.9814E−09 | C(6, 0) | 1.3618E−11 | C(4, 2) | 9.0496E−12 |
| C(2, 4) | −1.0897E−10 | C(0, 6) | 9.2678E−12 | C(6, 1) | −1.2140E−14 |
| C(4, 3) | −2.3569E−13 | C(2, 5) | 1.0415E−12 | C(0, 7) | 5.5456E−13 |
| C(8, 0) | −2.3154E−15 | C(6, 2) | −7.1285E−16 | C(4, 4) | 1.1031E−15 |
| C(2, 6) | −4.3228E−15 | C(0, 8) | −3.1944E−15 | | |

TABLE 9

Example 2

Eccentricity Data (Shortest-Distance Projection State)

| | S2 Coordinates Relative to Object Surface | S17 Ordinary Eccentricity | S18 Coordinates Relative to Object Surface | S19 (Image Surface) Coordinates Relative to Object Surface |
|---|---|---|---|---|
| XDE | 0.000000 | 0.000000 | 0.000000 | 0.000000 |
| YDE | 4.850000 | 0.000000 | 5.000000 | 5.000000 |
| ZDE | 37.820000 | 0.000000 | 401.340000 | −198.660000 |
| ADE | 0.000000 | 0.034035 | 0.000000 | 0.000000 |
| BDE | 0.000000 | 0.000000 | 0.000000 | 0.000000 |
| CDE | 0.000000 | 0.000000 | 0.000000 | 0.000000 |

TABLE 10

Example 2

Focus Data

| | | Shortest-Distance Projection State | Long-Distance Projection State |
|---|---|---|---|
| | d11 | 22.908 | 22.993 |
| S18 | ZDE | 401.340 | 397.951 |
| S19 | ZDE | −198.660 | −602.049 |

TABLE 11

Example 3

| Si | ri[mm] | di[mm] | Ni | vi | Elements etc. |
|---|---|---|---|---|---|
| S1 | ∞ | — | | | DS(Object Surface) |
| S2 | ∞ (R = 6.521) | 0.000 | | | ST      LG |
| S3 | 29.783 | 14.415 | 1.7478 | 24.3586 | L1 |
| S4 | 16.281 | 7.530 | 1.6011 | 58.9259 | |
| S5 | −16.143 | 0.700 | | | |
| S6 | −15.309 | 2.000 | 1.8477 | 27.3611 | L2 |
| S7 | 210.786 | 0.378 | | | |
| S8 | 69.079 | 10.707 | 1.7985 | 22.6000 | L3 |
| S9 | −38.297 | d9 | | | |
| S10 | 71.876 | 15.000 | 1.8175 | 43.0668 | L4 |
| S11 | −668.921 | 7.978 | | | |
| S12 | −47.966 (=RDY) | 10.000 | 1.4927 | 57.4912 | L5 (Plastic) |
| S13 | ∞ | — | | | |
| S14 | ∞ | — | | | MR |
| S15 | ∞ | | | | SC(Image Surface) |

TABLE 12

Example 3

Aspherical Surface Data of Si

| | S3 | S8 | S9 |
|---|---|---|---|
| K | 0.000000 | 0.000000 | 0.000000 |
| A | 0.563886E−05 | −0.111885E−04 | −0.146388E−05 |

TABLE 12-continued

Example 3

Aspherical Surface Data of Si

| | S3 | S8 | S9 |
|---|---|---|---|
| B | −0.826469E−08 | 0.313956E−08 | −0.647074E−08 |
| C | −0.325748E−10 | −0.779679E−10 | −0.215923E−10 |
| D | −0.573469E−14 | 0.143978E−12 | −0.454007E−13 |

TABLE 13

Example 3
Expanded Aspherical Surface Data of S12

| KY | 0.000000 | KX | 0.000000 | RDX | −48.17546 |
|---|---|---|---|---|---|
| AR | 0.271061E−05 | BR | −0.137490E−08 | | |
| CR | 0.113599E−11 | DR | −0.216643E−15 | | |
| AP | 0.116463E+00 | BP | 0.310168E+00 | | |
| CP | 0.296943E+00 | DP | 0.393767E+00 | | |

TABLE 14

Example 3

Polynomial Free-Form Curved Surface Data of S13: C(j, k)

| C(0, 1) | −6.7643E−03 | C(2, 0) | 1.1740E−02 | C(0, 2) | 1.1760E−02 |
|---|---|---|---|---|---|
| C(2, 1) | 1.0937E−05 | C(0, 3) | −3.0299E−06 | C(4, 0) | 3.7082E−07 |
| C(2, 2) | 1.4557E−06 | C(0, 4) | 2.7394E−06 | C(4, 1) | −1.0724E−08 |
| C(2, 3) | 1.0022E−07 | C(0, 5) | −1.1411E−08 | C(6, 0) | 1.2133E−11 |
| C(4, 2) | 6.5809E−10 | C(2, 4) | −1.2579E−08 | C(0, 6) | −5.2268E−09 |
| C(6, 1) | −1.2375E−11 | C(4, 3) | −1.6397E−10 | C(2, 5) | 3.8979E−10 |
| C(0, 7) | 1.6281E−10 | C(8, 0) | −9.6246E−13 | C(6, 2) | −7.2186E−14 |
| C(4, 4) | 4.0923E−12 | C(2, 6) | −3.9364E−12 | C(0, 8) | −1.4620E−12 |

Polynomial Free-Form Curved Surface Data of S14: C(j, k)

| C(0, 1) | 3.7609E−02 | C(2, 0) | −5.3214E−03 | C(0, 2) | −5.4284E−03 |
|---|---|---|---|---|---|
| C(2, 1) | 4.5118E−06 | C(0, 3) | 4.0139E−06 | C(4, 0) | 1.1532E−07 |
| C(2, 2) | 9.8427E−08 | C(0, 4) | 3.6840E−08 | C(4, 1) | −1.2532E−09 |
| C(2, 3) | −3.2713E−10 | C(0, 5) | 1.0043E−10 | C(6, 0) | −9.8600E−12 |
| C(4, 2) | −5.5410E−12 | C(2, 4) | −1.2785E−11 | C(0, 6) | −7.8896E−12 |
| C(6, 1) | 1.2342E−13 | C(4, 3) | 1.1927E−13 | C(2, 5) | 1.1236E−13 |
| C(0, 7) | 5.9949E−14 | C(8, 0) | 2.8670E−16 | C(6, 2) | −6.0761E−16 |
| C(4, 4) | −4.6245E−16 | C(2, 6) | −3.3194E−16 | C(0, 8) | −1.5975E−16 |

TABLE 15

Example 3

Eccentricity Data
(Shortest-Distance Projection State)

| | S2 Coordinates Relative to Object Surface | S10 Ordinary Eccentricity | S13 Ordinary Eccentricity | S14 Coordinates Relative to Object Surface | S15 (Image Surface) Coordinates Relative to Object Surface |
|---|---|---|---|---|---|
| XDE | 0.000000 | 0.000000 | 0.000000 | 0.000000 | 0.000000 |
| YDE | 6.000000 | 0.452017 | 0.000000 | 6.452000 | 6.452000 |
| ZDE | 37.800000 | 0.000000 | 0.000000 | 431.340000 | −168.660000 |
| ADE | 0.000000 | 0.000000 | 0.033200 | 0.000000 | 0.000000 |
| BDE | 0.000000 | 0.000000 | 0.000000 | 0.000000 | 0.000000 |
| CDE | 0.000000 | 0.000000 | 0.000000 | 0.000000 | 0.000000 |

TABLE 16

Example 3

Focus Data

| | | Shortest-Distance Projection State | Long-Distance Projection State |
|---|---|---|---|
| d9 | | 74.208 | 77.979 |
| S14 | ZDE | 431.340 | 422.582 |
| S15 | ZDE | −168.660 | −477.418 |

TABLE 17

Conditional Formula

| | (1) θ1(°) | (2) θ2(°) | (3), (3a) cxf/cyf | (4), (4a) cyf × OPK1/βyk | (5) Sd/Ent | (6), (6a) cyf × kyf |
|---|---|---|---|---|---|---|
| Example 1 | 8.27 | 18.83 | 1.412 | −0.049 | 0.977 | −0.160 |
| Example 2 | 7.29 | 12.79 | 1.315 | −0.054 | 1.000 | −0.219 |

TABLE 17-continued

| | | | | | | |
|---|---|---|---|---|---|---|
| Example 3 | 15.54 | 20.23 | 1.483 | −0.045 | 1.000 | −0.124 |

| | OPK1 | βyk | cxf | cyf |
|---|---|---|---|---|
| Example 1 | 830.2 | 108.7 | −0.00912 | −0.00646 |
| Example 2 | 820.9 | 110.3 | −0.00945 | −0.00719 |
| Example 3 | 883.9 | 110.4 | −0.00827 | −0.00558 |

| | OPK1/βyk | kyf | Ent | Sd |
|---|---|---|---|---|
| Example 1 | 7.6375345 | 24.7307 | 62.7701 | 61.3274 |
| Example 2 | 7.4424297 | 30.3974 | 37.82 | 37.82 |
| Example 3 | 8.0063406 | 22.2111 | 37.8 | 37.8 |

| | Shortest-Distance Projection State | | Long-Distance Projection State | |
|---|---|---|---|---|
| | βx | βy | βx | βy |
| Example 1 | 109.0 | 108.7 | 170.7 | 170.2 |
| Example 2 | 109.9 | 110.3 | 188.1 | 189.3 |
| Example 3 | 109.9 | 110.4 | 164.3 | 164.1 |

| | βyk | βye | θak-θae | Conditional Formula(7) βye/βyk | Conditional Formula(8) (θak-θae) × βyk/βye |
|---|---|---|---|---|---|
| Example 1 | 108.7 | 170.2 | 1.049 | 1.57 | 0.670 |
| Example 2 | 110.3 | 189.3 | 0.283 | 1.72 | 0.165 |
| Example 3 | 110.4 | 164.1 | 1.128 | 1.49 | 0.759 |

| | Tm | OPK1 | OPE1 | Conditional Formula(9) (1/OPK1 − 1/OPE1) × Tm × βyk |
|---|---|---|---|---|
| Example 1 | 16.84 | 830.2 | 1339.2 | 0.838033 |
| Example 2 | 3.389 | 820.9 | 1368 | 0.182112 |
| Example 3 | 8.758 | 883.9 | 1305 | 0.352976 |

What is claimed is:

1. A projection optical system receiving light from a display element to project an image displayed by the display element onto a screen with enlargement at a varying magnification achieved by varying a projection distance to the screen, the projection optical system comprising:
   a refractive optical system composed of one or more refractive lenses and having a positive optical power; and
   a concave-surfaced mirror disposed to a screen side of the refractive optical system and having a plane-symmetric reflective surface,
   wherein the projection optical system includes at least one optical element designed to be movable for focusing,
   wherein the projection optical system forms an intermediate image of the displayed image between the refractive optical system and the concave-surfaced mirror, and
   wherein conditional formula (1) below is fulfilled:

$$4° < \theta 1 < 20° \quad (1)$$

where
$\theta 1$ represents an angle of incidence, as measured on a cross-section of the concave-surfaced mirror along a plane of symmetry thereof, at which a ray, among rays incident on the screen when projection is performed at a shortest distance, that forms a smallest angle with a line normal to a screen surface is incident on the concave-surfaced mirror.

2. The projection optical system of claim 1,
wherein, to a display-element side of the concave-surfaced mirror, only said one or more refractive lenses are disposed as optical elements having optical powers, and
wherein conditional formula (2) below is fulfilled:

$$8° < \theta 2 < 25° \quad (2)$$

where, when the display element has a rectangular image-display area and a ray that travels from a center of the image-display area through a center of an aperture stop to a center of the screen is called an image center ray,
$\theta 2$ represents an angle, as measured on a cross-section of the display element along a plane parallel to shorter sides of the image-display area and including the image center ray, that principal rays that have left an upper end and a lower end of the image-display area of the display element form when leaving the refractive optical system when projection is performed at the shortest distance.

3. The projection optical system of claim 2,
wherein conditional formula (3) below is fulfilled:

$$1.15 < cxf/cyf < 1.65 \quad (3)$$

where, when the display element has a rectangular image-display area and a ray that travels from a center of the image-display area through a center of an aperture stop to a center of the screen is called an image center ray,
cxf represents a curvature, as measured in a direction of longer sides of the image-display area, that the reflective surface of the concave-surfaced mirror has at a position at which the image center ray is incident thereon, and
cyf represents a curvature, as measured in a direction of shorter sides of the image-display area, that the reflective surface of the concave-surfaced mirror has at a position at which the image center ray is incident thereon.

4. The projection optical system of claim 3,
wherein conditional formula (4) below is fulfilled:

$$-0.07 < cyf \times OPK1/\beta yk < -0.03 \quad (4)$$

where, when the display element has a rectangular image-display area and a ray that travels from a center of the image-display area through a center of an aperture stop to a center of the screen is called an image center ray,
cyf represents a curvature, as measured in a direction of shorter sides of the image-display area, that the reflective surface of the concave-surfaced mirror has at a position at which the image center ray is incident thereon,
OPK1 represents an optical path length of the image center ray from the reflective surface of the concave-surfaced mirror to the screen surface when projection is performed at the shortest distance, and
βyk represents a magnification on the screen surface when projection is performed at the shortest distance, as measured in the direction of the shorter sides of the image-display area.

5. The projection optical system of claim 4,
wherein, as a mirror having an optical power, only said concave-surfaced mirror is provided at a screen-side end of the projection optical system.

6. The projection optical system of claim 3,
wherein conditional formula (6) below is fulfilled:

$$-0.35 < cyf \times kyf < -0.05 \quad (6)$$

where, when the display element has a rectangular image-display area and a ray that travels from a center of the image-display area through a center of an aperture stop to a center of the screen is called an image center ray,
cyf represents a curvature, as measured in a direction of shorter sides of the image-display area, that the reflective surface of the concave-surfaced mirror has at a position at which the image center ray is incident thereon, and
kyf represents a focal length, as measured in the direction of the shorter sides of the image-display area, that the refractive optical system has at a position at which the image center ray passes therethrough.

7. The projection optical system of claim 6,
wherein, as a mirror having an optical power, only said concave-surfaced mirror is provided at a screen-side end of the projection optical system.

8. The projection optical system of claim 3,
wherein the concave-surfaced mirror moves for focusing, and
wherein, at least in a range in which conditional formula (7) below is fulfilled, angles of rays incident on the concave-surfaced mirror during focusing fulfill conditional formula (8) below:

$$1.4 \leq \beta ye/\beta yk \leq 1.8 \tag{7}$$

$$0.08 < (\theta ak - \theta ae) \times \beta yk/\beta ye < 1.2 \tag{8}$$

where
θak represents an angle of incidence, as measured on a cross-section of the display element along a plane parallel to shorter sides of the image-display area, of the ray, among rays traveling from the display element through a center of an aperture stop to the screen, that is most obliquely incident on the screen is incident on the concave-surfaced mirror when projection is performed at the shortest distance,
θae represents an angle of incidence, as measured on a cross-section of the display element along a plane parallel to shorter sides of the image-display area, of the ray, among rays traveling from the display element through the center of the aperture stop to the screen, that is most obliquely incident on the screen is incident on the concave-surfaced mirror when projection is performed at a long distance,
βyk represents a magnification on the screen surface when projection is performed at the shortest distance, as measured in the direction of the shorter sides of the image-display area, and
βye represents a magnification on the screen surface when projection is performed at a long distance, as measured in the direction of the shorter sides of the image-display area.

9. The projection optical system of claim 8,
wherein, at least in the range in which conditional formula (7) is fulfilled, conditional formula (9) below is fulfilled:

$$0.1 < (1/OPK1 - 1/OPE1) \times Tm \times \beta yk < 1.2 \tag{9}$$

where
OPK1 represents an optical path length of the image center ray from the reflective surface of the concave-surfaced mirror to the screen surface when projection is performed at the shortest distance,
OPE1 represents an optical path length of the image center ray from the reflective surface of the concave-surfaced mirror to the screen surface when projection is performed at a long distance, and
Tm represents an amount of movement of the concave-surfaced mirror from a position thereof for shortest-distance projection to a position thereof for long-distance projection with respect to the display element (with the concave-surfaced mirror moving in a direction in which it approaches the display element from the position for shortest-distance projection to the position for long-distance projection).

10. The projection optical system of claim 3,
wherein, as a mirror having an optical power, only said concave-surfaced mirror is provided at a screen-side end of the projection optical system.

11. The projection optical system of claim 8,
wherein, as a mirror having an optical power, only said concave-surfaced mirror is provided at a screen-side end of the projection optical system.

12. The projection optical system of claim 1,
wherein conditional formula (3) below is fulfilled:

$$1.15 < cxf/cyf < 1.65 \tag{3}$$

where, when the display element has a rectangular image-display area and a ray that travels from a center of the image-display area through a center of an aperture stop to a center of the screen is called an image center ray,
cxf represents a curvature, as measured in a direction of longer sides of the image-display area, that the reflective surface of the concave-surfaced mirror has at a position at which the image center ray is incident thereon, and
cyf represents a curvature, as measured in a direction of shorter sides of the image-display area, that the reflective surface of the concave-surfaced mirror has at a position at which the image center ray is incident thereon.

13. The projection optical system of claim 12,
wherein, as a mirror having an optical power, only said concave-surfaced mirror is provided at a screen-side end of the projection optical system.

14. The projection optical system of claim 1,
wherein conditional formula (4) below is fulfilled:

$$-0.07 < cyf \times OPK1/\beta yk < -0.03 \tag{4}$$

where, when the display element has a rectangular image-display area and a ray that travels from a center of the image-display area through a center of an aperture stop to a center of the screen is called an image center ray,
cyf represents a curvature, as measured in a direction of shorter sides of the image-display area, that the reflective surface of the concave-surfaced mirror has at a position at which the image center ray is incident thereon,
OPK1 represents an optical path length of the image center ray from the reflective surface of the concave-surfaced mirror to the screen surface when projection is performed at the shortest distance, and
βyk represents a magnification on the screen surface when projection is performed at the shortest distance, as measured in the direction of the shorter sides of the image-display area.

15. The projection optical system of claim 14,
wherein, as a mirror having an optical power, only said concave-surfaced mirror is provided at a screen-side end of the projection optical system.

16. The projection optical system of claim 1,
wherein conditional formula (6) below is fulfilled:

$$-0.35 < cyf \times kyf < -0.05 \tag{6}$$

where, when the display element has a rectangular image-display area and a ray that travels from a center of the image-display area through a center of an aperture stop to a center of the screen is called an image center ray,
cyf represents a curvature, as measured in a direction of shorter sides of the image-display area, that the reflective surface of the concave-surfaced mirror has at a position at which the image center ray is incident thereon, and
kyf represents a focal length, as measured in the direction of the shorter sides of the image-display area, that the refractive optical system has at a position at which the image center ray passes therethrough.

17. The projection optical system of claim 1,
wherein the concave-surfaced mirror moves for focusing, and
wherein, at least in a range in which conditional formula (7) below is fulfilled, angles of rays incident on the concave-surfaced mirror during focusing fulfill conditional formula (8) below:

$$1.4 \leq \beta ye/\beta yk \leq 1.8 \tag{7}$$

$$0.08 < (\theta ak - \theta ae) \times \beta yk/\beta ye < 1.2 \tag{8}$$

where

θak represents an angle of incidence, as measured on a cross-section of the display element along a plane parallel to shorter sides of the image-display area, of the ray, among rays traveling from the display element through a center of an aperture stop to the screen, that is most obliquely incident on the screen is incident on the concave-surfaced mirror when projection is performed at the shortest distance, θae represents an angle of incidence, as measured on a cross-section of the display element along a plane parallel to shorter sides of the image-display area, of the ray, among rays traveling from the display element through the center of the aperture stop to the screen, that is most obliquely incident on the screen is incident on the concave-surfaced mirror when projection is performed at a long distance, βyk represents a magnification on the screen surface when projection is performed at the shortest distance, as measured in the direction of the shorter sides of the image-display area, and βye represents a magnification on the screen surface when projection is performed at a long distance, as measured in the direction of the shorter sides of the image-display area.

18. The projection optical system of claim 17,
wherein, at least in the range in which conditional formula (7) is fulfilled, conditional formula (9) below is fulfilled:

$$0.1 < (1/OPK1 - 1/OPE1) \times Tm \times \beta yk < 1.2 \tag{9}$$

where

OPK1 represents an optical path length of the image center ray from the reflective surface of the concave-surfaced mirror to the screen surface when projection is performed at the shortest distance, OPE1 represents an optical path length of the image center ray from the reflective surface of the concave-surfaced mirror to the screen surface when projection is performed at a long distance, and Tm represents an amount of movement of the concave-surfaced mirror from a position thereof for shortest-distance projection to a position thereof for long-distance projection with respect to the display element (with the concave-surfaced mirror moving in a direction in which it approaches the display element from the position for shortest-distance projection to the position for long-distance projection).

19. The projection optical system of claim 18,
wherein, as a mirror having an optical power, only said concave-surfaced mirror is provided at a screen-side end of the projection optical system.

20. The projection optical system of claim 17,
wherein, as a mirror having an optical power, only said concave-surfaced mirror is provided at a screen-side end of the projection optical system.

21. The projection optical system of claim 1,
wherein, as a mirror having an optical power, only said concave-surfaced mirror is provided at a screen-side end of the projection optical system.

* * * * *